_(12)_ United States Patent
Karani

(10) Patent No.: US 10,708,420 B2
(45) Date of Patent: Jul. 7, 2020

(54) METHOD AND SYSTEM FOR AUTOMATICALLY TRANSCRIBING A CALL AND UPDATING A RECORD BASED ON TRANSCRIBED VOICE DATA

(71) Applicant: salesforce.com, inc., San Francisco, CA (US)

(72) Inventor: Vijay Karani, Saratoga, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 15/933,267

(22) Filed: Mar. 22, 2018

(65) Prior Publication Data

US 2019/0297186 A1 Sep. 26, 2019

(51) Int. Cl.
| | | |
|---|---|---|
| *H04M 3/42* | (2006.01) | |
| *G10L 15/18* | (2013.01) | |
| *G06Q 30/00* | (2012.01) | |
| *G06F 16/22* | (2019.01) | |
| *G06F 40/151* | (2020.01) | |
| *G06F 40/205* | (2020.01) | |

(52) U.S. Cl.
CPC ........ *H04M 3/42221* (2013.01); *G06F 16/22* (2019.01); *G06F 40/151* (2020.01); *G06F 40/205* (2020.01); *G06Q 30/01* (2013.01); *G10L 15/1822* (2013.01); *H04M 3/42059* (2013.01); *H04M 3/42102* (2013.01); *H04M 2201/41* (2013.01); *H04M 2201/60* (2013.01)

(58) Field of Classification Search
CPC ........... H04M 3/4222; H04M 3/42102; H04M 3/42059; H04M 2201/41; H04M 2201/60; G06F 16/22; G06F 17/2264; G06F 17/2705; G06Q 30/01; G10L 15/1822
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |

(Continued)

*Primary Examiner* — Akelaw Teshale
(74) *Attorney, Agent, or Firm* — LKGlobal | Lorenz & Kopf, LLP

(57) ABSTRACT

An intelligent transcription and automated record generation system and method are provided in which a record identification module can identify a record in a customer relationship management (CRM) database that is relevant to a call, and a voice recognition and transcription engine can process audio information from the call and transcribe voice data from the call to generate transcribed voice data. The calling party can be one or more of a caller who is making a call and a callee that is receiving the call. A record updater module can then automatically modify the record to include at least part of the transcribed voice data, and automatically add the modified record to the CRM database.

18 Claims, 17 Drawing Sheets

(56) References Cited

U.S. PATENT DOCUMENTS

| | | |
|---|---|---|
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,467,542 B1* | 10/2016 | Messenger ........ H04M 1/27457 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0069102 A1* | 3/2005 | Chang .................. H04M 3/493 |
| | | 379/88.18 |
| 2005/0091098 A1 | 4/2005 | Brodersen et al. |
| 2006/0021019 A1 | 1/2006 | Hinton et al. |
| 2006/0093103 A1* | 5/2006 | Timmins ............. H04M 3/4938 |
| | | 379/88.19 |
| 2008/0220753 A1* | 9/2008 | Matsuda ................ H04M 3/56 |
| | | 455/416 |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2010/0131271 A1* | 5/2010 | Marquette ........... H04M 3/4938 |
| | | 704/235 |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0040249 A1* | 2/2014 | Ploesser ................ G06Q 10/10 |
| | | 707/723 |
| 2015/0012278 A1* | 1/2015 | Metcalf .................. G10L 15/22 |
| | | 704/270.1 |

(56) References Cited

U.S. PATENT DOCUMENTS

2015/0110260 A1* 4/2015 Marum ............... H04M 3/4285
379/207.02
2016/0275942 A1* 9/2016 Drewes .................. G10L 15/06

* cited by examiner

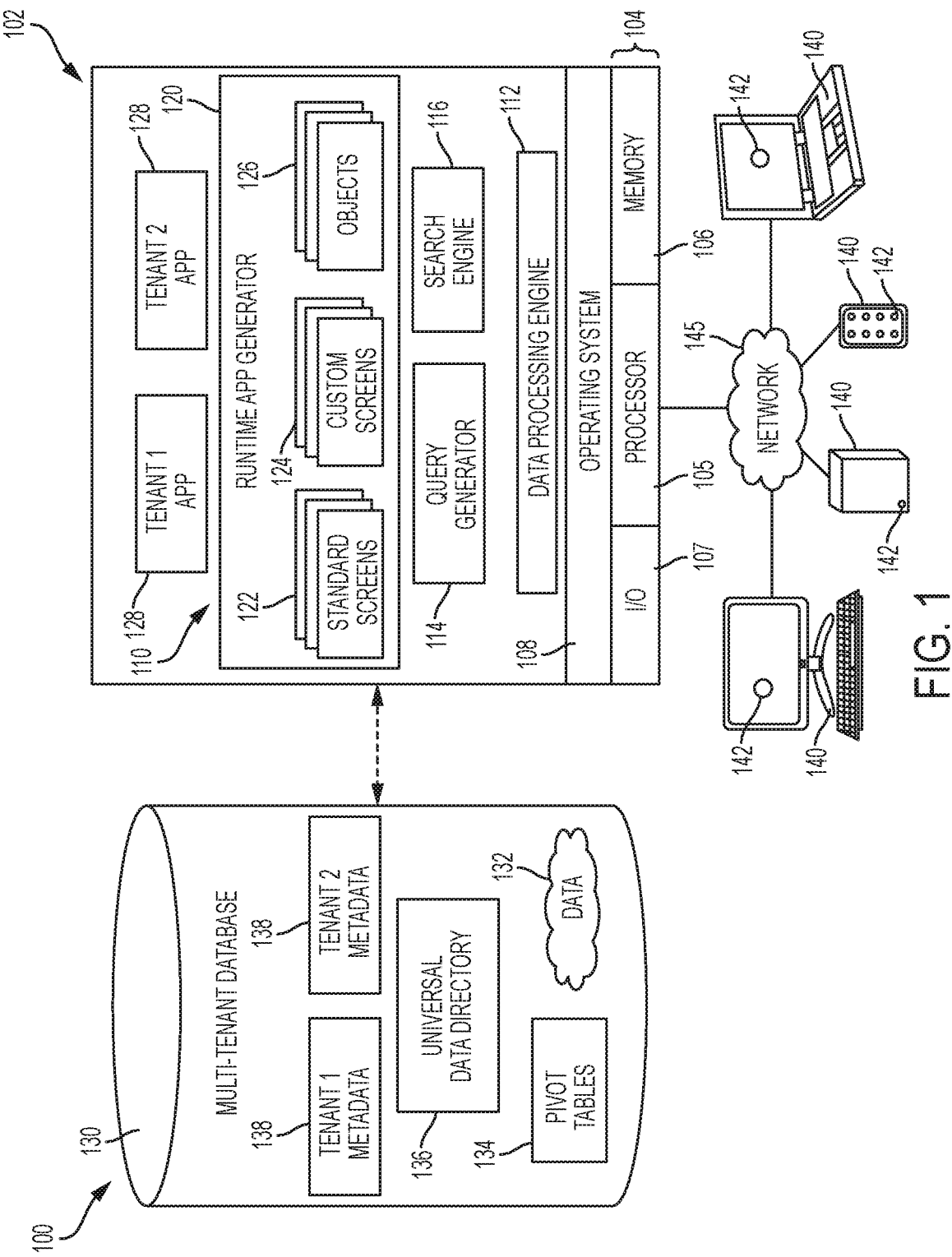

US 10,708,420 B2

METHOD AND SYSTEM FOR AUTOMATICALLY TRANSCRIBING A CALL AND UPDATING A RECORD BASED ON TRANSCRIBED VOICE DATA

TECHNICAL FIELD

Embodiments of the subject matter described herein relate generally to customer relationship management applications. More particularly, embodiments of the subject matter relate to a method and system for automatically transcribing a call (e.g., an incoming call from a party or an outgoing call made to a party) and automatically generating information, based on transcribed voice data from the call that can be used for updating one or more relevant records associated with the call.

BACKGROUND

Today many enterprises now use cloud-based computing platforms that allow services and data to be accessed over the Internet (or via other networks). Infrastructure providers of these cloud-based computing platforms offer network-based processing systems that often support multiple enterprises (or tenants) using common computer hardware and data storage. This "cloud" computing model allows applications to be provided over a platform "as a service" supplied by the infrastructure provider. The infrastructure provider typically abstracts the underlying hardware and other resources used to deliver a customer-developed application so that the customer no longer needs to operate and support dedicated server hardware. The cloud computing model can often provide substantial cost savings to the customer over the life of the application because the customer no longer needs to provide dedicated network infrastructure, electrical and temperature controls, physical security and other logistics in support of dedicated server hardware.

Many cloud-based applications are generated based on data that is accessed from storage, and then delivered to a user system such as a mobile device or desktop computer. For example, the Salesforce Mobile platform offered by Salesforce.com provides a customer relationship management application that can provide an end user with sophisticated customer relationship data. Records for each customer can be stored at a server system. The end user can launch the Salesforce Mobile application and submit requests to the server system over a network to access records that are relevant to a particular customer. The server system fetches the relevant records, which can then be presented to the end user via the Salesforce Mobile application to provide the end user with a wealth of information about that particular customer.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 1 is a schematic block diagram of an example of a multi-tenant computing environment in which features of the disclosed embodiments can be implemented in accordance with some of the disclosed embodiments.

DETAILED DESCRIPTION

Figure 3A:
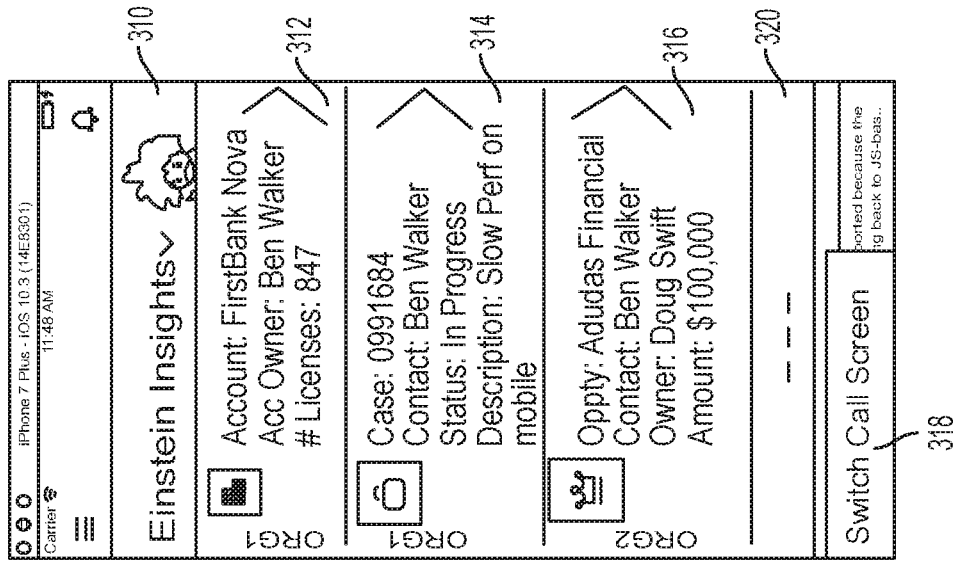
FIG. 3A is another example of a graphical user interface displayed at the mobile communication device during the voice-over-IP call to display a dynamic insights page in accordance with the disclosed embodiments.

As used herein, the term "call" can refer to a communication by telephone. A call includes at least one human party, and a minimum of two parties that can be referred to as a caller and callee. The caller is the party who initiates the call. The callee refers to one or more parties that receives the call. Each type of call includes, at a minimum, audio information being communicated from at least one party, and typically involves a conversation between two or more calling parties. For instance, the most typical example a call involves a conversation between a caller and a callee that includes audio information being communicated from both the caller and callee to each other. Types of calls include a regular voice-only call, a Voice over Internet Protocol (VoIP) call, a video call, etc. A regular voice call refers to a call communicated over a cellular service provider or landline using a public switched telephone network (PSTN). VoIP refers to a methodology and group of technologies for the delivery of voice communications and multimedia sessions over Internet Protocol (IP) networks, such as the Internet. The terms Internet telephony, broadband telephony, and broadband phone service specifically refer to the provisioning of communications services (voice, fax, SMS, voice-messaging) over the public Internet, rather than via the public switched telephone network (PSTN). VoIP enables people to use the Internet as the transmission medium for telephone calls by sending voice data in packets using IP rather than by traditional circuit transmissions of the PSTN. Mobile VoIP is an extension of mobility to a Voice over IP network. A video call can refer to any type of call that allows for the reception and transmission of audio-video signals for communication between parties in near real-time. A few non-limiting examples of commercially available video call technologies include Skype®, Apple's Facetime®, and video-over-LTE® video calling systems.

When an incoming call is received by a callee from a caller (or an outgoing call is made to a callee by a caller), it can be difficult for the callee or caller to access data (e.g., records) that are relevant to the call that is taking place, and update them with information about the call (e.g., add detail from the conversation to an existing record, or modify an existing record to include details from the conversation, or create a new record that includes details from the conversation). This is partly due to the fact that the user had to open an application (e.g., a CRM application), search for the data (e.g., records) that are of relevance, and then decide which records are the most important or relevant to the conversation, and then update records accordingly based on details from the call or conversation. The process of identifying data (e.g., records) that are relevant to a particular customer and then retrieving that data can be time-consuming, inefficient and difficult to do in real-time. It would be desirable to speed up the process of identifying and accessing records that are relevant for a particular customer to improve user experience. Currently, automated intelligence is not applied in determining which data (e.g., records) are most relevant to a particular caller or callee. It would be desirable to provide improved technologies that can intelligently predict (e.g., probabilistically) which data (e.g., records) are most likely to be of importance, and present the user with an easy way to access those records in real-time when a call is made or received by the user. By applying intelligence when selecting the data (e.g., records) that are presented to a user during the call, a better user experience and more productive call can be achieved by the user especially for certain types of calls such as business or sales calls.

Technologies are provided for providing a "dynamic" insights page that is displayed at a user interface of a computing device (e.g., a mobile communication device) in response to a call. The call can be either an incoming call received by the computing device, or an outgoing call made from the computing device. When an incoming call is received, or when an outgoing call is made, the caller who is making a call and/or the callee that is receiving the call can be identified along with one or more relevant organizations. For example, in one embodiment, identifying information (e.g., a contact name or phone number) can be determined that is associated with the caller and other identifying information can be determined that is associated with the callee. The identifying information can be used to determine a first contact identifier for the caller that is specific to an application platform and one or more first organization identifiers for the caller that are specific to the application platform. The other identifying information can be used to determine a second contact identifier for the callee that is specific to the application platform and one or more second organization identifiers for the callee that are specific to the application platform. The relevant organizations can include any organizations associated with and relevant to the caller or the callee.

A customer relationship management (CRM) application can then be launched at the computing device, and relevant records that are relevant to the call and to be included as part of the insights page can be automatically determined at a server system. In one embodiment, when the call is a regular call, the CRM application can be manually launched in response to a user input. In another embodiment, when the call is a voice-over-IP call or video call, the CRM application can automatically launch after identifying the caller.

In one implementation, that can be used when the call is a VoIP call, the CRM application can execute at the computing device and retrieve the relevant records from the server system that can then be used by the CRM application at the computing device to generate the insights page. In another implementation, that can be used during a regular call, the CRM application can execute at the computing device and request an insights page, and a corresponding CRM application at the server system of a cloud-based application platform, can determine the relevant records and deliver content for the insights page to the computing device, which can then be opened at the CRM application of the computing device. In yet another implementation, that can be used during a regular call or a VoIP call or a video call, the CRM application can execute only at the computing device and can determine relevant records that are cached on the computing device, and then generate an insights page at the computing device. This implementation can be useful, for example, when the computing device is unable to communicate with the server system (e.g., poor network connectivity or for some other reason) because it allows an insights page to be generated and displayed using relevant records for a particular organization that are cached on the device.

In one embodiment, records that reference one or more identifiers in a contact profile associated with the caller can be identified as being relevant records. The contact profile associated with the caller comprises one or more of: a contact identifier for the caller and an organization identifier for the caller. Likewise, records that reference one or more identifiers in a contact profile associated with the callee can be identified as being relevant records. The contact profile associated with the callee comprises one or more of: a contact identifier for the callee and an organization identifier for the callee. The relevant records can be ranked in priority order according to order of relevance from most relevant to least relevant. The relevant records can include records that are determined to be relevant to the call from any organization that a user has access privileges to that allow that user to access records. The relevant records can be associated with and related to the caller that was identified, or to the callee that was identified.

In one embodiment, each of the relevant records can be stored within a CRM system and has an object type associated with a particular type of object. Records can include user CRM information. For example, each of the relevant records can be associated with a particular organization, and can be determined at the server system by analyzing CRM information maintained at the CRM system. The CRM information can include records for any type of object (described below), such as an opportunity object, a lead object, a case object, an account object, reports and dashboards. For instance, the records can be associated with at least one of: an opportunity object, a lead object, an account object, etc.

The insights page that is displayed at the user interface of the computing device includes user interface elements for accessing the relevant records. Each user interface element is linked to and selectable to open a relevant record that has been determined to be relevant to the call. Each user interface element can include a summary of the relevant record that is linked to and associated with. In one embodiment, each user interface element functions as a hyperlink that, when selected, causes a new page to open and be displayed that includes the relevant record. The user interface elements can be displayed, for example, in a list view ranked according to a priority order. The insights page that is displayed can also include an intelligence summary report that includes a user interface element that summarizes the highest ranked intelligence information with respect to the caller or the callee, schedule information, habits information, goal information, social media reference information, etc. In one embodiment, the intelligence summary report is a report that can include one or more user interface elements that summarize the highest ranked intelligence information with respect to the caller a call is being received from or the callee who a call is being made to. The intelligence information included can provide one or more of: a contact name for the caller/callee; the organizations that are associated with that caller/callee; information about the organizations that are associated with that caller/callee; information extracted from organization feeds; rating information for the caller/callee that indicates their importance; key details or critical data about the caller/callee extracted from relevant records or other CRM data; information extracted from Internet data sources such as news sites or social media postings. Additionally, in some embodiments, color coding can be applied to the user interface elements that are displayed at the insights page to provide quick way to spot the key records.

An intelligent transcription and automated record generation system and method are also provided where a record identification module can identify a record in a customer relationship management (CRM) database that is relevant to a call, and a voice recognition and transcription engine can process audio information from the call and transcribe voice data from the call to generate transcribed voice data. In addition, for a video call, video information including important images, screenshot(s) and/or specific message(s) presented on the GUI of the recipient's user system (e.g., mobile communication device) can be extracted and captured. For example, in one embodiment, an identification module can identify, based on call data, a calling party that is part of a call, and provide identification information that identifies the calling party to the record identification module, which can then identify existing record(s) in the CRM database that is/are relevant to the call, or create a new record in the CRM database if no records can be identified in the CRM database that are relevant to the call. As noted above, the calling party can be one or more of a caller who is making a call and a callee that is receiving the call.

A record updater module can then automatically modify the record to include at least part of the transcribed voice data, and automatically add the modified record to the CRM database. In addition, when the call is a video call, video information including important images, screenshot(s) and/or specific message(s) that were extracted and captured from the GUI of the recipient's user system can be added to the record. Here, "modify the record" can refer to modifying an existing record or creating a new record. For example, the record updater module can automatically modify an existing record to include at least part of the transcribed voice data to generate an updated version of the existing record. By contrast, when the record identification module can not identify any existing record in the CRM database that is relevant to a call, the record updater module can automatically generate a new record in the CRM database that includes at least part of the transcribed voice data.

In one embodiment, the modified record (e.g., the modified version of an existing record or new record) can then be published via a publisher module in a social media feed to update the social media feed with the modified record.

In one embodiment, prior to automatically adding the modified record (e.g., the modified version of an existing record or new record) to the CRM database and/or publishing the modified record, the transcribed voice data from the call can be displayed as a user interface element at a user interface of a user system along with an option to edit the transcribed voice data. The user can may or may not edit the modified record, and then make an input via the user interface approving addition of the modified record to the CRM database, at which point the record updater module can automatically add the modified record (e.g., as edited or in its original form if not edited) to the CRM database.

In one embodiment, a filtering and summarization module can parse content of the transcribed voice data, and select, based on information that identifies the record from the record identification module, appropriate filtering and summarization criteria that can be used to identify key portions of the transcribed voice data to be summarized as part of the record. In other words, the key portions of the transcribed voice data are portions of the transcribed voice data that are to be summarized in the record. The key portions of the transcribed voice data can be identified, based on the appropriate filtering and summarization criteria, as filtered voice data, and then provided to the record updater module, which can then automatically modify the record to include the filtered voice data.

FIG. 1 is a schematic block diagram of an example of a multi-tenant computing environment in which features of the disclosed embodiments can be implemented in accordance with the disclosed embodiments. As shown in FIG. 1, an exemplary cloud-based solution may be implemented in the context of a multi-tenant system 100 including a server 102 (or server system 102) that supports applications 128 based upon data 132 from a database 130 that may be shared between multiple tenants, organizations, or enterprises, referred to herein as a multi-tenant database. The multi-tenant system 100 can be shared by many different organizations, and handles the storage of, and access to, different metadata, objects, data and applications across disparate organizations. In one embodiment, the multi-tenant system 100 can be part of a database system, such as a multi-tenant database system.

The multi-tenant system 100 can provide applications and services and store data for any number of organizations. Each organization is a source of metadata and data associated with that metadata that collectively make up an application. In one implementation, the metadata can include customized content of the organization (e.g., customizations done to an instance that define business logic and processes for an organization). Some non-limiting examples of metadata can include, for example, customized content that describes a build and functionality of objects (or tables), tabs, fields (or columns), permissions, classes, pages (e.g., Apex pages), triggers, controllers, sites, communities, workflow rules, automation rules and processes, etc. Data is associated with metadata to create an application. Data can be stored as one or more objects, where each object holds particular records for an organization. As such, data can include records (or user content) that are held by one or more objects.

The multi-tenant system 100 allows users of user systems 140 to establish a communicative connection to the multi-tenant system 100 over a network 145 such as the Internet or any type of network described herein. Based on a user's interaction with a user system 140, the application platform 110 accesses an organization's data (e.g., records held by an object) and metadata that is stored at one or more database systems 130, and provides the user system 140 with access to applications based on that data and metadata. These applications are executed or run in a process space of the application platform 110 will be described in greater detail below. The user system 140 and various other user systems (not illustrated) can interact with the applications provided by the multi-tenant system 100. The multi-tenant system 100 is configured to handle requests for any user associated with any organization that is a tenant of the system. Data and services generated by the various applications 128 are provided via a network 145 to any number of user systems 140, such as desktops, laptops, tablets, smartphones or other client devices, Google Glass™, and any other computing device implemented in an automobile, aircraft, television, or other business or consumer electronic device or system, including web clients.

Each application 128 is suitably generated at run-time (or on-demand) using a common application platform 110 that securely provides access to the data 132 in the database 130 for each of the various tenant organizations subscribing to the system 100. The application platform 110 has access to one or more database systems 130 that store information (e.g., data and metadata) for a number of different organizations including user information, organization information, custom information, etc. The database systems 130 can include a multi-tenant database system 130 as described with reference to FIG. 1, as well as other databases or sources of information that are external to the multi-tenant database system 130 of FIG. 1. In accordance with one non-limiting example, the service cloud 100 is implemented in the form of an on-demand multi-tenant customer relationship management (CRM) system that can support any number of authenticated users for a plurality of tenants.

As used herein, a "tenant" or an "organization" should be understood as referring to a group of one or more users (typically employees) that share access to common subset of the data within the multi-tenant database 130. In this regard, each tenant includes one or more users and/or groups associated with, authorized by, or otherwise belonging to that respective tenant. Stated another way, each respective user within the multi-tenant system 100 is associated with, assigned to, or otherwise belongs to a particular one of the plurality of enterprises supported by the system 100.

Each enterprise tenant may represent a company, corporate department, business or legal organization, and/or any other entities that maintain data for particular sets of users (such as their respective employees or customers) within the multi-tenant system 100. Although multiple tenants may share access to the server 102 and the database 130, the particular data and services provided from the server 102 to each tenant can be securely isolated from those provided to other tenants. The multi-tenant architecture therefore allows different sets of users to share functionality and hardware resources without necessarily sharing any of the data 132 belonging to or otherwise associated with other organizations.

The multi-tenant database 130 may be a repository or other data storage system capable of storing and managing the data 132 associated with any number of tenant organizations. The database 130 may be implemented using conventional database server hardware. In various embodiments, the database 130 shares processing hardware 104 with the server 102. In other embodiments, the database 130 is implemented using separate physical and/or virtual database server hardware that communicates with the server 102 to perform the various functions described herein.

In an exemplary embodiment, the database 130 includes a database management system or other equivalent software capable of determining an optimal query plan for retrieving and providing a particular subset of the data 132 to an instance of application (or virtual application) 128 in response to a query initiated or otherwise provided by an application 128, as described in greater detail below. The multi-tenant database 130 may alternatively be referred to herein as an on-demand database, in that the database 130 provides (or is available to provide) data at run-time to on-demand virtual applications 128 generated by the application platform 110, as described in greater detail below.

In practice, the data 132 may be organized and formatted in any manner to support the application platform 110. In various embodiments, the data 132 is suitably organized into a relatively small number of large data tables to maintain a semi-amorphous "heap"-type format. The data 132 can then be organized as needed for a particular virtual application 128. In various embodiments, conventional data relationships are established using any number of pivot tables 134 that establish indexing, uniqueness, relationships between entities, and/or other aspects of conventional database organization as desired. Further data manipulation and report formatting is generally performed at run-time using a variety of metadata constructs. Metadata within a universal data directory (UDD) 136, for example, can be used to describe any number of forms, reports, workflows, user access privileges, business logic and other constructs that are common to multiple tenants.

Tenant-specific formatting, functions and other constructs may be maintained as tenant-specific metadata 138 for each tenant, as desired. Rather than forcing the data 132 into an inflexible global structure that is common to all tenants and applications, the database 130 is organized to be relatively amorphous, with the pivot tables 134 and the metadata 138 providing additional structure on an as-needed basis. To that end, the application platform 110 suitably uses the pivot tables 134 and/or the metadata 138 to generate "virtual" components of the virtual applications 128 to logically obtain, process, and present the relatively amorphous data 132 from the database 130.

The server 102 may be implemented using one or more actual and/or virtual computing systems that collectively provide the dynamic application platform 110 for generating the virtual applications 128. For example, the server 102 may be implemented using a cluster of actual and/or virtual servers operating in conjunction with each other, typically in association with conventional network communications, cluster management, load balancing and other features as appropriate. The server 102 operates with any sort of conventional processing hardware 104, such as a processor 105, memory 106, input/output features 107 and the like. The input/output features 107 generally represent the interface(s) to networks (e.g., to the network 145, or any other local area, wide area or other network), mass storage, display devices, data entry devices and/or the like.

The processor 105 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 106 represents any non-transitory short or long term storage or other computer-readable media capable of storing programming instructions for execution on the processor 105, including any sort of random access memory (RAM), read only memory (ROM), flash memory, magnetic or optical mass storage, and/or the like. The computer-executable programming instructions, when read and executed by the server 102 and/or processor 105, cause the server 102 and/or processor 105 to create, generate, or otherwise facilitate the application platform 110 and/or virtual applications 128 and perform one or more additional tasks, operations, functions, and/or processes described herein. It should be noted that the memory 106 represents one suitable implementation of such computer-readable media, and alternatively or additionally, the server 102 could receive and cooperate with external computer-readable media that is realized as a portable or mobile component or platform, e.g., a portable hard drive, a USB flash drive, an optical disc, or the like.

The server 102, application platform 110 and database systems 130 can be part of one backend system. Although not illustrated, the multi-tenant system 100 can include other backend systems that can include one or more servers that work in conjunction with one or more databases and/or data processing components, and the application platform 110 can access the other backend systems.

The multi-tenant system 100 includes one or more user systems 140 that can access various applications provided by the application platform 110. The application platform 110 is a cloud-based user interface. The application platform 110 can be any sort of software application or other data processing engine that generates the virtual applications 128 that provide data and/or services to the user systems 140. In a typical embodiment, the application platform 110 gains access to processing resources, communications interfaces and other features of the processing hardware 104 using any sort of conventional or proprietary operating system 108.

The virtual applications 128 are typically generated at run-time in response to input received from the user systems 140. For the illustrated embodiment, the application platform 110 includes a bulk data processing engine 112, a query generator 114, a search engine 116 that provides text indexing and other search functionality, and a runtime application generator 120. Each of these features may be implemented as a separate process or other module, and many equivalent embodiments could include different and/or additional features, components or other modules as desired.

The runtime application generator 120 dynamically builds and executes the virtual applications 128 in response to specific requests received from the user systems 140. The virtual applications 128 are typically constructed in accordance with the tenant-specific metadata 138, which describes the particular tables, reports, interfaces and/or other features of the particular application 128. In various embodiments, each virtual application 128 generates dynamic web content that can be served to a browser or other client program 142 associated with its user system 140, as appropriate.

The runtime application generator 120 suitably interacts with the query generator 114 to efficiently obtain multi-tenant data 132 from the database 130 as needed in response to input queries initiated or otherwise provided by users of the user systems 140. In a typical embodiment, the query generator 114 considers the identity of the user requesting a particular function (along with the user's associated tenant), and then builds and executes queries to the database 130 using system-wide metadata 136, tenant specific metadata 138, pivot tables 134, and/or any other available resources. The query generator 114 in this example therefore maintains security of the common database 130 by ensuring that queries are consistent with access privileges granted to the user and/or tenant that initiated the request.

With continued reference to FIG. 1, the data processing engine 112 performs bulk processing operations on the data 132 such as uploads or downloads, updates, online transaction processing, and/or the like. In many embodiments, less urgent bulk processing of the data 132 can be scheduled to occur as processing resources become available, thereby giving priority to more urgent data processing by the query generator 114, the search engine 116, the virtual applications 128, etc.

In exemplary embodiments, the application platform 110 is utilized to create and/or generate data-driven virtual applications 128 for the tenants that they support. Such virtual applications 128 may make use of interface features such as custom (or tenant-specific) screens 124, standard (or universal) screens 122 or the like. Any number of custom and/or standard objects 126 may also be available for integration into tenant-developed virtual applications 128. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system.

The data 132 associated with each virtual application 128 is provided to the database 130, as appropriate, and stored until it is requested or is otherwise needed, along with the metadata 138 that describes the particular features (e.g., reports, tables, functions, objects, fields, formulas, code, etc.) of that particular virtual application 128. For example, a virtual application 128 may include a number of objects 126 accessible to a tenant, wherein for each object 126 accessible to the tenant, information pertaining to its object type along with values for various fields associated with that respective object type are maintained as metadata 138 in the database 130. In this regard, the object type defines the structure (e.g., the formatting, functions and other constructs) of each respective object 126 and the various fields associated therewith.

Still referring to FIG. 1, the data and services provided by the server 102 can be retrieved using any sort of personal computer, mobile telephone, tablet or other network-enabled user system 140 on the network 145. In an exemplary embodiment, the user system 140 includes a display device, such as a monitor, screen, or another conventional electronic display capable of graphically presenting data and/or information retrieved from the multi-tenant database 130, as described in greater detail below.

Typically, the user operates a conventional browser application or other client program 142 executed by the user system 140 to contact the server 102 via the network 145 using a networking protocol, such as the hypertext transport protocol (HTTP) or the like. The user typically authenticates his or her identity to the server 102 to obtain a session identifier ("SessionID") that identifies the user in subsequent communications with the server 102. When the identified user requests access to a virtual application 128, the runtime application generator 120 suitably creates the application at run time based upon the metadata 138, as appropriate. However, if a user chooses to manually upload an updated file (through either the web based user interface or through an API), it will also be shared automatically with all of the users/devices that are designated for sharing.

As noted above, the virtual application 128 may contain Java, ActiveX, or other content that can be presented using conventional client software running on the user system 140; other embodiments may simply provide dynamic web or other content that can be presented and viewed by the user, as desired. As described in greater detail below, the query generator 114 suitably obtains the requested subsets of data 132 from the database 130 as needed to populate the tables, reports or other features of the particular virtual application 128.

The server system 102 communicates with user systems 140. The server system 102 includes an application, or application platform that serves applications 128 to user systems. In accordance with the disclosed embodiments, the virtual applications 128 can include an insights application that is used to generate dynamic insights pages that can be displayed at a UI of the user systems 140 when a call is made or received. The user systems 140 or server system 102 can identify one or more relevant organizations, the caller who is making a call and the callee that is receiving the call. As will be explained in greater detail below with reference to FIGS. 2-7, when a user receives an incoming on their user system, or makes an outgoing call via their user system, the insights application can be launched and used to generate a dynamic insights page that is displayed via a graphical user interface at the user system. In response to the call, the server system 102 can execute the customer relationship management (CRM) application to determine relevant records that are relevant to the call and to be included as part of an insights page that is displayed at the user system 140. The dynamic insights page includes user interface elements that are each linked to a record that is potentially relevant to the call. The user interface elements can be selected for accessing relevant records. Each user interface element is linked to and selectable to open a relevant record that has been determined to be relevant to the call. Each user interface element can include a summary of the relevant record that is linked to and associated with. In one embodiment, each user interface element functions as a hyperlink that, when selected, causes a new page to open and be displayed that includes the relevant record. The user interface elements can be displayed, for example, in a list view ranked according to a priority order.

Although FIG. 1 illustrates the application being implemented using a cloud-based application or cloud-based application platform, it can also be implemented using any web application, or any client-server application. The application can access data (e.g., records) from an address space of a process. In general, the application can be hosted at the same system as the server system or at a different system than the server system. Depending on the implementation, data can be stored at storage that can be, for example, remote storage (e.g., cloud-based storage) or local storage (e.g., a database of a server system). In some implementations, the insights application can be implemented using cloud-based application platforms, such as, the Salesforce mobile application, Lightning applications (SFX), or any variants thereof. For example, in one embodiment, the application 128 can be a mobile application served by an application platform, such as Salesforce mobile application and used by mobile devices running the Salesforce mobile app.

Objects and Records

In one embodiment, the multi-tenant database system 130 can store data in the form of records and customizations. As used herein, the term "record" can refer to a particular occurrence or instance of a data object that is created by a user or administrator of a database service and stored in a database system, for example, about a particular (actual or potential) business relationship or project. The data object can have a data structure defined by the database service (a standard object) or defined by a subscriber (custom object).

An object can refer to a structure used to store data and associated metadata along with a globally unique identifier (called an identity field) that allows for retrieval of the object. In one embodiment implementing a multi-tenant database, all of the records for the tenants have an identifier stored in a common table. Each object comprises a number of fields. A record has data fields that are defined by the structure of the object (e.g. fields of certain data types and purposes). An object is analogous to a database table, fields of an object are analogous to columns of the database table, and a record is analogous to a row in a database table. Data is stored as records of the object, which correspond to rows in a database. The terms "object" and "entity" are used interchangeably herein. Objects not only provide structure for storing data, but can also power the interface elements that allow users to interact with the data, such as tabs, the layout of fields on a page, and lists of related records. Objects can also have built-in support for features such as access management, validation, formulas, triggers, labels, notes and attachments, a track field history feature, security features, etc. Attributes of an object are described with metadata, making it easy to create and modify records either through a visual interface or programmatically.

A record can also have custom fields defined by a user. A field can be another record or include links thereto, thereby providing a parent-child relationship between the records. Customizations can include custom objects and fields, Apex Code, Visualforce, Workflow, etc.

Examples of objects include standard objects, custom objects, and external objects. A standard object can have a pre-defined data structure that is defined or specified by a database service or cloud computing platform. A standard object can be thought of as a default object. For example, in one embodiment, a standard object includes one or more pre-defined fields that are common for each organization that utilizes the cloud computing platform or database system or service.

A few non-limiting examples of different types of standard objects can include sales objects (e.g., accounts, contacts, opportunities, leads, campaigns, and other related objects); task and event objects (e.g., tasks and events and their related objects); support objects (e.g., cases and solutions and their related objects); salesforce knowledge objects (e.g., view and vote statistics, article versions, and other related objects); document, note, attachment objects and their related objects; user, sharing, and permission objects (e.g., users, profiles, and roles); profile and permission objects (e.g., users, profiles, permission sets, and related permission objects); record type objects (e.g., record types and business processes and their related objects); product and schedule objects (e.g., opportunities, products, and schedules); sharing and team selling objects (e.g., account teams, opportunity teams, and sharing objects); customizable forecasting objects (e.g., includes forecasts and related objects); forecasts objects (e.g., includes objects for collaborative forecasts); territory management (e.g., territories and related objects associated with territory management); process objects (e.g., approval processes and related objects); content objects (e.g., content and libraries and their related objects); chatter feed objects (e.g., objects related to feeds); badge and reward objects; feedback and performance cycle objects, etc. For example, a record can be for a business partner or potential business partner (e.g. a client, vendor, distributor, etc.) of the user, and can include an entire company, subsidiaries, or contacts at the company. As another example, a record can be a project that the user is working on, such as an opportunity (e.g. a possible sale) with an existing partner, or a project that the user is working on.

By contrast, a custom object can have a data structure that is defined, at least in part, by an organization or by a user/subscriber/admin of an organization. For example, a custom object can be an object that is custom defined by a user/subscriber/administrator of an organization, and includes one or more custom fields defined by the user or the particular organization for that custom object. Custom objects are custom database tables that allow an organization to store information unique to their organization. Custom objects can extend the functionality that standard objects provide.

In one embodiment, an object can be a relationship management entity having a record type defined within platform that includes a customer relationship management (CRM) database system for managing a company's relationships and interactions with their customers and potential customers. Examples of CRM entities can include, but are not limited to, an account, a case, an opportunity, a lead, a project, a contact, an order, a pricebook, a product, a solution, a report, a forecast, a user, etc. For instance, an opportunity can correspond to a sales prospect, marketing project, or other business related activity with respect to which a user desires to collaborate with others.

External objects are objects that an organization creates that map to data stored outside the organization. External objects are like custom objects, but external object record data is stored outside the organization. For example, data that's stored on premises in an enterprise resource planning (ERP) system can be accessed as external objects in real time via web service callouts, instead of copying the data into the organization.

Figure 2:
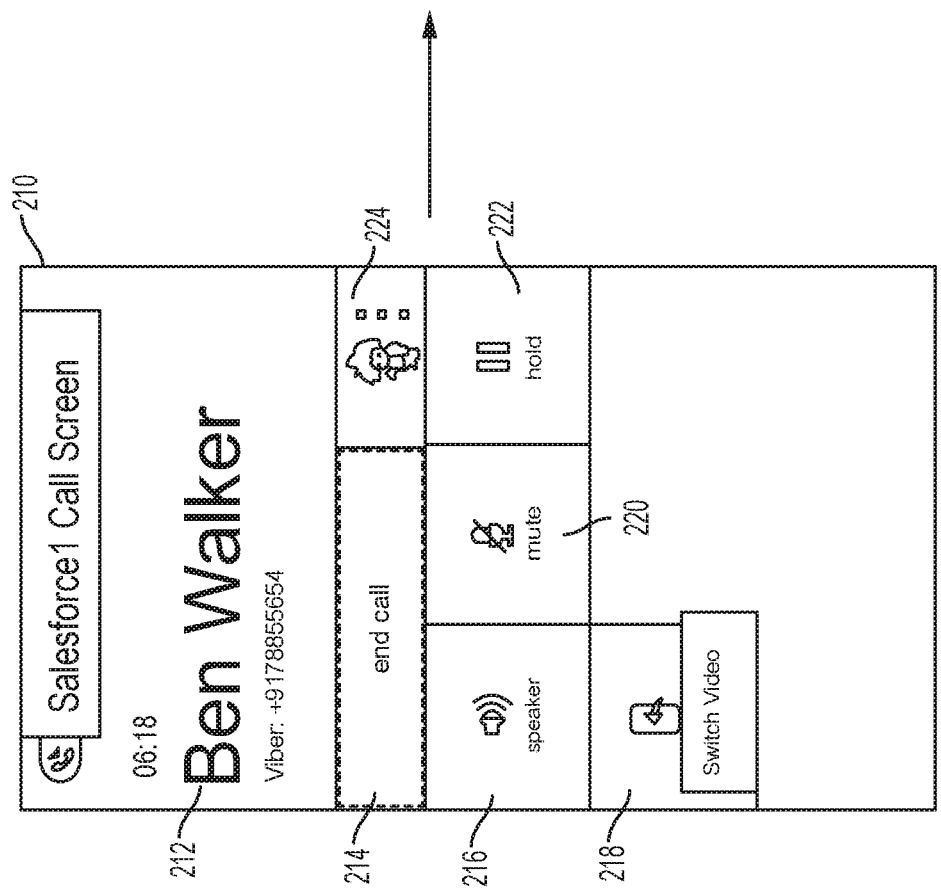
FIG. 2 is an example of a graphical user interface that can be displayed at a mobile communication device when a user receives an incoming voice-over-IP (VoIP) call in accordance with the disclosed embodiments.

FIGS. 2 and 3A-3C show graphical user interfaces that can be displayed at a mobile communication device when a user receives an incoming voice-over-IP (VoIP) call in accordance with the disclosed embodiments. FIG. 2 is an example of a graphical user interface that can be displayed at a mobile communication device when a user receives an incoming voice-over-IP (VoIP) call (or video call) in accordance with the disclosed embodiments. Referring again to FIG. 2, a graphical user interface is shown that can be displayed at a mobile communication device 140 when the mobile communication device 140 receives an incoming voice-over-IP call (or video call) in accordance with the disclosed embodiments. In this example, a user receives a voice-over-IP call (or video call) from a contact named Ben Walker. The graphical user interface can include various user-interface elements including, but not limited to, an end call button 214 that can be selected to end the call, a speaker button 216 that can be selected to place the call on speaker, a switch video button 218 that can be used to switch the incoming voice-over-IP call from a voice call to a video call, a mute button 220 that can be selected to mute the voice-over-IP call, a hold button 222 that can be selected to place the caller of the voice-over-IP call on hold. In addition, the graphical user interface also includes an action button 224 that can be used to launch a Salesforce® mobile CRM application (also known as Salesforce mobile and Salesforce1) and display the dynamic insights page 310 as shown in FIG. 3A.

FIG. 3A is another example of a graphical user interface displayed at the mobile communication device during the voice-over-IP call (or video call) to display a dynamic insights page in accordance with the disclosed embodiments. As will be described in greater detail below, in this embodiment, when a user receives an incoming voice-over-IP call using a voice-over-IP application on their mobile communication device, a dynamic insights page 310 can be displayed via a graphical user interface at the mobile communication device 140. This dynamic insights 310 page can include, for example, user interface elements 312, 314, 316 that are each linked to a record that has been determined to be relevant to the call. Each UI element is selectable to open the particular record that it is linked to and associated with. Each UI element can include a short summary of the record that is linked to and associated with. In one embodiment, each UI element functions as a type of hyperlink that, when selected, causes a new page to open and be displayed that includes the actual record. Although not illustrated in FIG. 3A, in some embodiments, each UI element can also include "sub-UI elements," such as other hyperlinks or action buttons, that can be used to trigger other actions with respect to the record that is associated with that UI element, such as creation of new records or updating the record (e.g., adding further details, for instance, by transcription or manual input).

Figures 3B, 3C:
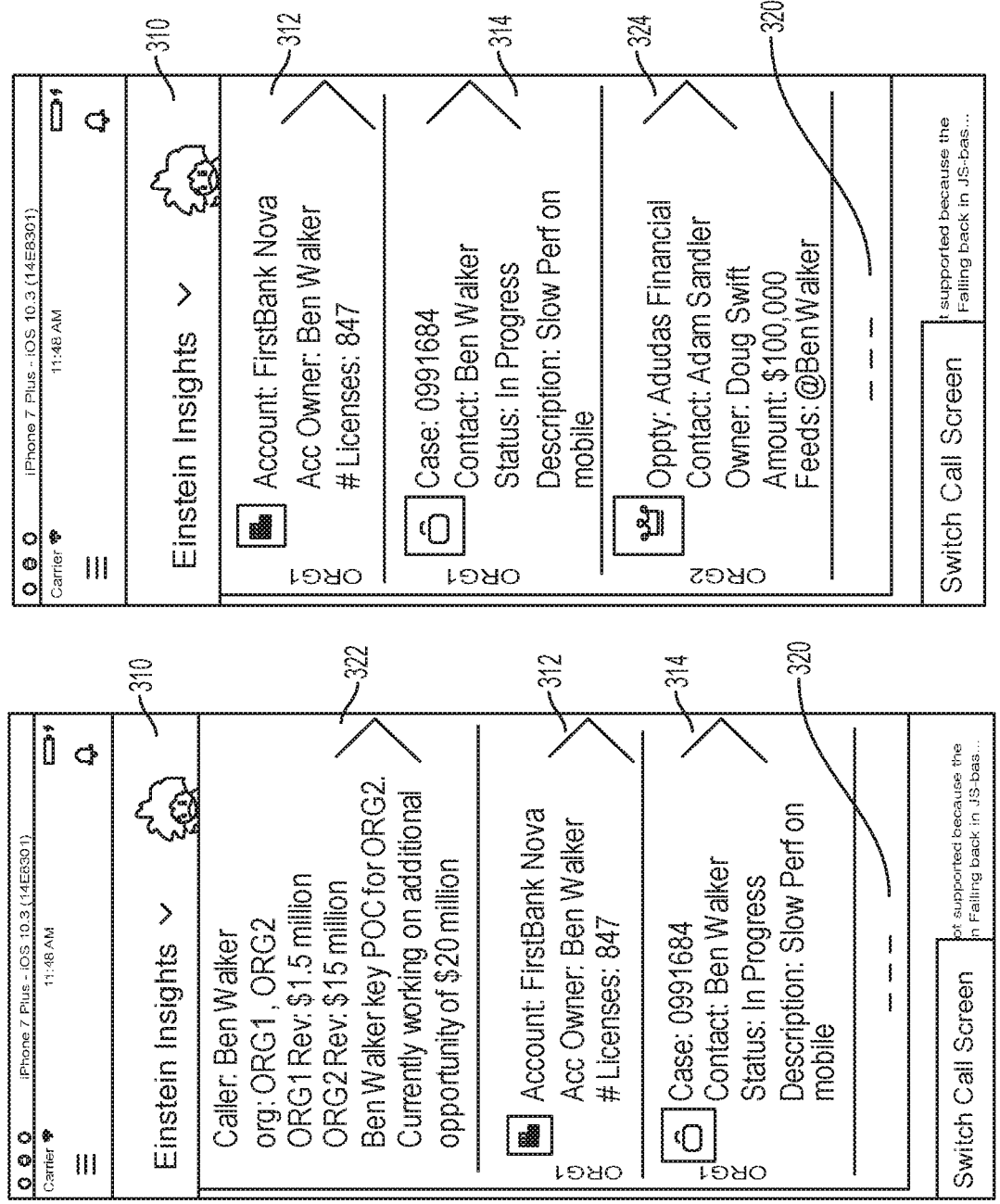
FIG. 3B is another example of a graphical user interface displayed at the mobile communication device during the voice-over-IP call to display a dynamic insights page having an intelligence summary report in accordance with the disclosed embodiments.
FIG. 3C is another example of a graphical user interface displayed at the mobile communication device during the voice-over-IP call to display a dynamic insights page in accordance with the disclosed embodiments.

Further, in some embodiments, the dynamic insights page can also display an intelligence summary report. FIG. 3B is another example of a graphical user interface displayed at the mobile communication device during the voice-over-IP call (or video call) to display a dynamic insights page having an intelligence summary report in accordance with the disclosed embodiments. FIG. 3B is similar to FIG. 3A except that it includes an intelligence summary report 322. The intelligence summary report 322 shown in FIG. 3B provides the contact name for the caller, the organizations that are associated with that caller, information about the organizations, and a summary of key details about the caller. However, this is one non-limiting example of information that can be included in an intelligence summary report.

In general, an intelligence summary report is a report that can include one or more user interface elements that summarize the highest ranked intelligence information with respect to the caller a call is being received from or the callee who a call is being made to. The intelligence information included can provide one or more of: a contact name for the caller/callee; the organizations that are associated with that caller/callee; information about the organizations that are associated with that caller/callee; information extracted from organization feeds; rating information for the caller/callee that indicates their importance; key details or critical data about the caller/callee extracted from CRM data, CRM related records, CRM Feeds, or other CRM data; information extracted from Internet data sources such as news sites or social media postings.

In the non-limiting example that is illustrated in FIGS. 3A and 3B, the records are associated with the calling party (or "caller") named Ben Walker. However, it should be appreciated that this is not a limitation. The records that are relevant can be associated with any person including the calling party, but do not necessarily have to be associated with the calling party to be considered to be relevant. For instance, the records can also be associated with the party being called (or "callee") or any other records that are determined to be relevant to the call that is currently taking place. In addition, it should be appreciated that the records displayed on the dynamic insights page can come not only from organizations of the caller and/or callee, but can also be extracted from other, different organizations that the caller and callee do not necessarily belong to, but that the callee has permission or privileges to access. In this regard, the records can be pulled from any organization that the user has been given privilege to access. The records can be associated with any person who belongs to those organizations including, but not limited to, the party being called and/or the party a call is being received from, or any other party including those who are not even part of the call as will be described below with reference to FIG. 3C.

Referring again to FIG. 3A, the user interface elements 312, 314, 316 that are displayed via the dynamic insights page 310 are each linked to a record that has been determined to be relevant to the call taking place. In the non-limiting embodiments shown in FIG. 3A, the UI elements are displayed in a "list" view; however, it should be appreciated that the UI elements can be displayed in other ways or formats to present a quick summary of relevant records and allow for easy selection and scrolling operations to be performed by the end user (e.g., one finger operations). The list view that is illustrated can be customized by the user to change the layout, color scheme used for each object type, the number of UI elements presented, the level of detail provided in each UI element, etc. For instance, in this example, each summary includes four lines of text, but each summary could include any number of lines of text depending on the implementation. In other embodiments, instead of a summary of the record, each UI element could potentially include actual records although in most cases each record would take up significant screen space.

Depending on the implementation, the relevant records can be identified using standard matching, and/or advanced matching techniques. The user can configure the insights application to use standard or advanced matching techniques for each object/record type.

The standard matching techniques can identify which records are relevant by finding records that reference and are directly associated with contact profile for the calling party. In one embodiment, the contact profile can include a contact identifier and/or organization identifier of (1) the party being called and/or (2) of the party a call is being received from. After identifying the relevant records that correspond to the contact profile, the standard matching techniques can then rank all of the potentially relevant records in order of importance in order of priority. In one embodiment, the contact identifier can be determined by using the contact name and associating it with a contact identifier that is used within the platform to identify a user, and/or organization identifier that is associated with that user within the platform. For instance, in one example, the application can search entities, such as fields of records, feeds of records, or followers of a record, or social media/document mentions for the callee/caller, or news feeds, for a matching the contact identifier (and/or organization identifier) to find records that are potentially relevant.

As one non-limiting example, records can be associated with a contact identifier or organization identifier for a specific caller, and records (e.g., lead name for a lead record, contact to an account record, or contact for the case record, etc.) associated with one or more of those identifiers can be found and then ranked according to their relevance in priority order from highest to lowest (e.g., most important to least important). For instance, when a caller makes a call, any organizations that the caller belongs to can be identified, and any records that the caller has access privileges to within that organization that relate to the party being called can be identified, ranked according to relevance, and UI elements for at least some of those relevant records can then be displayed in the insights page.

Likewise, the party being called may also belong to a separate organization, and any records within that organization that reference the caller or the party being called can be identified as being relevant, ranked according to relevance, and UI elements for at least some of those relevant records can then be displayed in the insights page.

By contrast, advanced matching techniques can identify which records are relevant using the standard matching techniques (described above), and also by finding records that indirectly reference and/or that are indirectly associated with a contact identifier or organization identifier of (1) the party being called and/or (2) of the party a call is being received from. AI technologies can find records that are determined to be of potential relevance and that are associated with second, third . . . , n-th level connections of the parties of the call, and then rank all of the potentially relevant records in order of importance or priority. The priority or ordering of those records can be determined using artificial intelligence technologies that identify records or other information that are relevant to a particular call or caller so that the user who is receiving the call has information available that can assist the user during his/her conversation with the particular caller. In one embodiment, the relevant records can be ranked using intelligent scoring algorithms that assign a relevance score to each relevant record, and then rank them from most relevant match to the least relevant match.

In one embodiment, an intelligent ranking module at the server system can apply one or more ranking algorithms to rank, based on input parameters such as object types or organizations, the relevant records according to an order of priority (or priority order) that indicates relative importance to the user. The ranking module can then dynamically rank all of the relevant records according to relative priority. For example, in one implementation, the ranking module outputs a matrix that includes the relevant records ordered according to relative priority. This way records that are likely to be most relevant to the user, based on the current profile for that user will readily be available to the user.

In one embodiment, the algorithm used by the ranking module is configurable based on preferences of the end user. For example, in one implementation, a weighting value can be assigned to each input parameter to indicate a relative importance of each input parameter, and the user can set/adjust weighting values to scale the relative importance of each input parameter. Examples of input parameters having adjustable weighting values can include things such as contact information for a particular caller/callee (e.g., name, contact's phone number, email, social media handle, etc.), CRM data, CRM related data, CRM feeds; feeds in which a particular caller/callee is mentioned or tagged in; object types; organizations, social media sources, etc. This allows the user to tune the ranking algorithm(s) to suit their individual preferences. Thus, for example, a user could set/adjust weighting values for each object type, to change relative importance of various types of relevant records so that each can be assigned its own importance. This way, if the user cares more about seeing records related to opportunity type objects as opposed to records related to lead type objects, the user can adjust the ranking algorithm so that records related to opportunity type objects will be of greater importance. By default, if the user does not change weighting values, the ranking module will use default weighting values to rank the relevant records.

The artificial intelligence technologies can provide, for example, predictive scoring, forecasting, and recommendations to narrow down the possible records, and prioritize the order for the records. The predictive capabilities of AI can be used, for example, to predict the which records are likely to be useful, and make smart recommendations based on the parties to the call. Various types of artificial intelligence modules or engines can be used to generate insights. This can be done, for example, by looking up records that are associated with a person who the call is being received from, or records that are associated with a person who is being called, and then using those records to determine which records or which other related records are relevant for this call. For example, in one implementation, records that are relevant can be identified by looking up the associated records for the caller or calling person, and artificial intelligence modules for predictive scoring, forecasting and recommendations can be used to narrow down the relevant records, and prioritize the order that those relevant records are displayed within the dynamic insights page.

In one implementation, Salesforce Einstein or similar AI technologies can be used to deliver advanced AI capabilities into sales, service, marketing and more, to provide a personalized and predictive customer experience for the user. Salesforce Einstein embeds advanced AI capabilities in the Salesforce Platform—in fields, objects, workflows, components and more. Salesforce Einstein leverages all the customer data in Salesforce including activity data from Salesforce Chatter, email, calendar and e-commerce; social data streams such as tweets and images; and even IoT signals—to train predictive models for sales, service, marketing, commerce and more. Powered by advanced machine learning, deep learning, predictive analytics, natural language processing and smart data discovery, Salesforce Einstein can allow models to be automatically customized for the user. These models learn, self-tune and get smarter with every interaction and additional piece of data. Salesforce Einstein can automatically discover and/or predict relevant records or insights that are related to the call.

AI technologies can be leveraged to process CRM data and identify records that provide highest order of match for the callee/caller user, and provide a ranked list of the matched records that are included in the dynamic insights page for: discovery, prediction, lead scoring, feed search, opportunity, account, feed and journey insights, activity capture, automated contacts, recommendations, engagement scoring, image classification, etc. The discovery module can perform analysis to find insights in millions of data combinations by automatically examining all variable combinations. Prediction modules can be standard or custom AI models that analyze any Salesforce field or object type to predict and rank relevant records for that field or object type. The lead scoring module automatically prioritizes the leads most likely to convert based on history and past deals. The feed search module can provide top-ranked answers to searches based on relevance and engagement signals such as most recent, likes, views, and answers; the search algorithm uses the Einstein Learn to Rank technique to get better over time so users always get the best results. The opportunity insights module can let a user know whether or not a deal is likely to close (e.g., can identify customer sentiment, competitor involvement, and overall prospect engagement). The account insights module can provide insights regarding key business developments pertinent to accounts (e.g., customers' latest news, M&A activity, company expansion updates, etc.). The feed insights module keeps members engaged by identifying and promoting popular content to ensure that important posts and hot-button conversations are seen, thanks to an intelligent activity feed. The journey insights module can leverage AI to analyze billions of touchpoints across consumer journeys and discover the optimal paths to conversion, including insights about which channels, messages, and events perform best. The activity capture module connects email and calendar to Salesforce to keep records up to date without any tedious data entry. The automated contacts module analyzes emails and calendar events, identifies new contacts and any contact role relationships, and surfaces suggestions for automatically adding new records to CRM. The recommendations module can be used to provide recommendations that recommend the next best product, content, or offer faster for every customer on any channel. The engagement scoring module can discover insights about why consumers click or purchase, and drive smarter marketing using predicted behavior. The image classification module can recognize logos, objects, food, and scenes in social images to discover new insights regarding a brand—like where certain products are being used—even if a name or keywords aren't mentioned.

In the embodiment illustrated in FIG. 3A, the dynamic insights page 310 includes user interface elements 312, 314, 316 that are each linked to a record associated with the caller. However, in other embodiments, the dynamic insights page 310 can include other user interface elements that are each linked to a record associated with the caller, other user interface elements that are each linked to a record associated with the callee, or other user interface elements that are each linked to a record associated with another person or entity and determined to be relevant to the call, as shown in FIG. 3C, which is another example of a graphical user interface displayed at the mobile communication device during the voice-over-IP call to display a dynamic insights page in accordance with the disclosed embodiments. FIG. 3C is similar to FIG. 3A except that the opportunity type record associated with the user interface element 324 is associated with an owner named Doug Swift who is not part of the call that is taking place.

In this non-limiting embodiment, the user interface elements 312, 314, 316 are each linked to a record associated with a particular caller who is making the voice-over-IP call to a user (or "callee"). In this example, the dynamic insights page 310 displays user interface elements 312, 314, 316 that are linked to a number of records that are associated with the caller, Ben Walker, including a UI element 312 to a record for an account type object, a UI element 314 to a record for a case type object, and a UI element 316 to a record for an opportunity type object. In addition, although not shown due to page constraints, any number of other user interface elements (that are each linked to a record) could be included to other records. For example, the user can scroll through the page 310 to display the additional user interface elements that are not visible in FIG. 3A, but are each linked to other records. Each of the records can be associated with a particular organization. For instance, in this example, the user interface elements 312, 314 are each linked to a record associated with a first organization (ORG1), whereas the user interface element 316 is linked to a record associated with a second organization (ORG2). The graphical user interface can also include other types of action buttons, such as a switch call screen button 318 that can be selected by the user to switch back to the call screen that is illustrated in FIG. 2. In addition, the ellipsis button 320 can be selected to cause a pop-up sub-menu (not shown) appear that allows a user to take certain predefined actions with respect to a particular record that is selected such as: mark for later, book mark, edit the record, create a new record, etc. In addition, other action buttons can be included that allow the user to cause an insights summary page (not shown) that summarizes all of the relevant records according to.

Figure 3D:
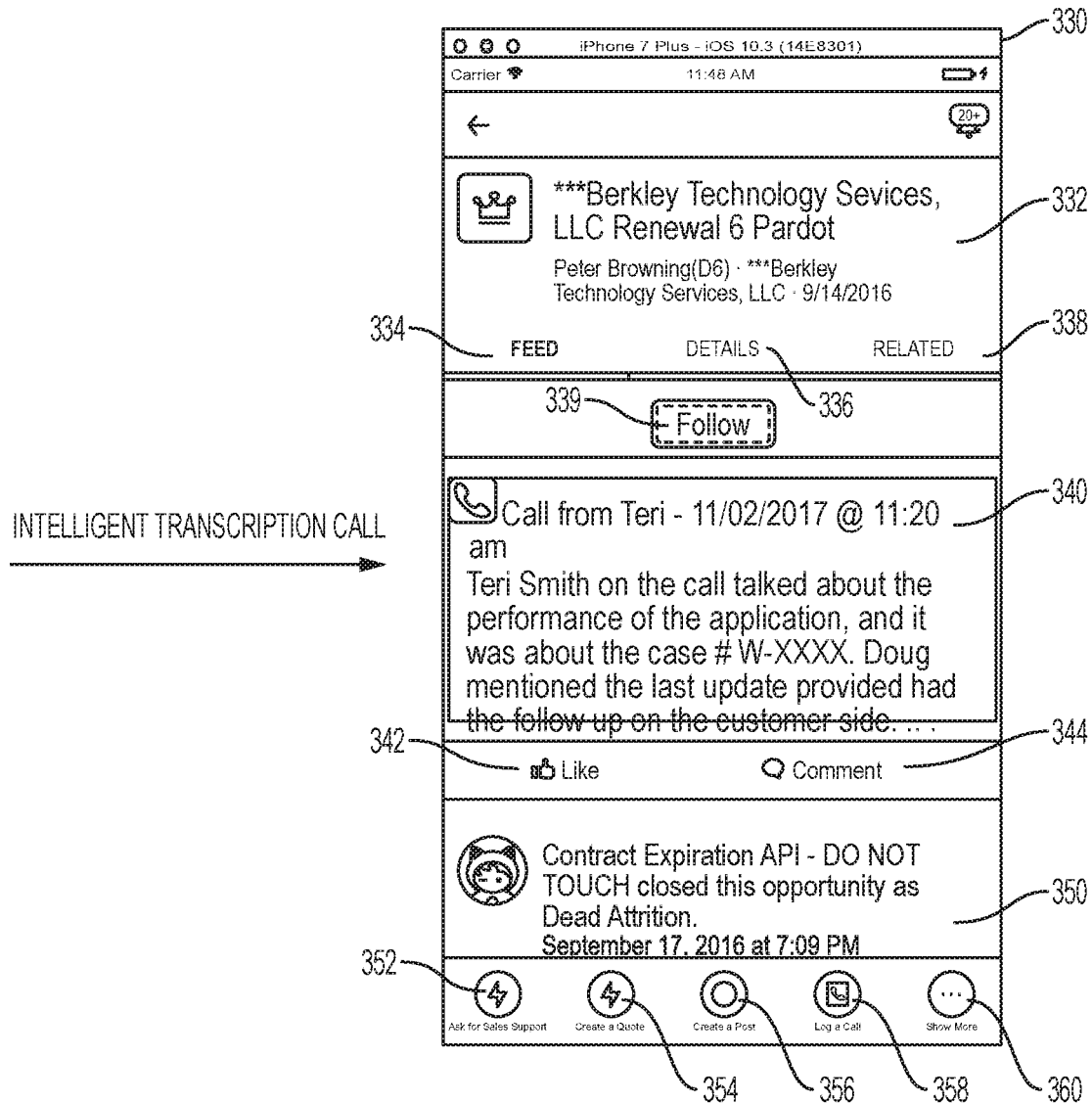
FIG. 3D is another example of another graphical user interface displayed at the mobile communication device during the voice-over-IP call to display another page having a record transcription panel in accordance with the disclosed embodiments.

FIG. 3D is another example of another graphical user interface 330 displayed at the mobile communication device during the voice-over-IP call (or video call or regular call) to display another page having a record transcription panel in accordance with the disclosed embodiments. In this particular non-limiting example, FIG. 3D shows a GUI 330 used to display a page for a social media feed such as Salesforce.com's Chatter®. Various records 332, 350 can be displayed within the social media feed. The GUI 330 includes various user interface elements or icons. In this non-limiting example, the GUI 330 includes a record 332 associated with a call, a record transcription panel 340 that is used to display filtered voice data extracted from the call that can be added to the record 332, a previous record 350 in the social media feed that was being viewed when the call happened and the record transcription panel 340 appeared, and various action buttons 352-360. The previous record 350 that is displayed in the social media feed is not necessarily associated with the record 332 that is displayed at record transcription panel 340, although in some cases the previous record 350 that is displayed in the social media feed may be associated with the record 332. In addition, it should be noted that the text displayed at record transcription panel 340 does not necessarily need to be associated with an existing record like 332. In such cases the text displayed at record transcription panel 340 can be used to create an entirely new record (not illustrated) in which case the record transcription panel 340 could appear at the top of the feed (e.g., where record 332 appears in FIG. 3D).

In the example shown in FIG. 3D, the record 332 that is displayed in the record transcription panel 340 is also referred to below as an "original" record 332 because in this use case it is associated and being updated with filtered voice data (from the record transcription panel 340), but has not yet been updated with filtered voice data. By contrast, in another use case where the record 332 is not associated with the filtered voice data (from the record transcription panel 340), then the record 332 is simply the "current" record that was being viewed when the call occurred and the record transcription panel 340 appeared.

A number of application buttons can be displayed along with the record 332. The application buttons that are displayed can vary depending on the implementation including depending on settings or preferences defined by the user. In this implementation, the application buttons include a feed button 334 that can be selected to open a page for a social media feed, a details button 336 that can be selected to display additional details about the record 332 that are not currently shown (e.g., display additional details about the record 332 in-line in the current page or by opening a new pages that displays the additional details about the record 332), a related records button 338 that can be selected by the user to display records that are related to the record 332 associated with the call, and a follow contact button 339 that can be selected to follow the record 332 and any information associated with the record so that every time the record is updated the user will get a notification that indicates that it has been updated and a summary of the record details that have been updated. The record 332 can be used to display record details for the record (e.g., used to display information about a particular company that is associated with the record, information about a particular contact who can be the caller or callee, and any other record details for that record).

In accordance with the disclosed embodiments, the record transcription panel 340 can display filtered voice data from the call that is generated, by an intelligent transcription and automated record generation system, based on transcribed voice data from the call. If the user wants to edit the filtered voice data prior to adding the filtered voice data to the original record 332 (or using the filtered voice data to create a new record), the user may edit the filtered voice data before the original record 332 is updated with the filtered voice data (or before the new record 332 is created using the filtered voice data). For example, in one embodiment, the user may touch the record transcription panel 340 and cursor will appear. The user can control a cursor to select some of the filtered voice data and a keyboard will appear in the GUI 330. The user can interact with the keyboard to edit the filtered voice data (e.g., delete text from the filtered voice data, add text to the filtered voice data, select some or all of the filtered voice data, cut or copy the filtered voice data that is selected, paste information into the filtered voice data that is selected, look up additional information about the filtered voice data that is selected, etc.). When the user is finished editing the filtered voice data and ready to add it to the original record 332, the user can approve the filtered voice data for addition to the record 332. After approval by the user, the intelligent transcription and automated record generation system can update the original record 332 with the filtered voice data from the call (or in the case where the filtered voice data is being used to create a new record, the intelligent transcription and automated record generation system can create the new record using the filtered voice data from the call).

The like button 342 can be selected by the user to like the record 332 so that other people viewing or following the record 332 know that the user has positively acknowledged the record 332. The comment button 344 can be selected by the user to add a comment to the record 332 that can be seen by other people viewing or following the record 332. The like or add comment buttons 342, 344 can be selected by the user before or after the original record 332 is updated with the filtered voice data from the call. When the like or add comment buttons 342, 344 are selected by the user after the original record 332 is updated with the filtered voice data from the call, the user can select like button 342 to like the portion of the record 332 that includes to the filtered voice data, or can select comment button 344 to add a comment to the portion of the record 332 that includes to the filtered voice data.

The GUI 330 includes an action bar that can be used to display various action buttons 352-360. The action buttons 352-360 shown in FIG. 3D are not limiting, and other action buttons can be displayed that are not shown. The user can configure the action buttons that are displayed in the action bar to meet their specific needs. In this non-limiting embodiment, the action button 352 can be selected by the user to ask for sales support. The action button 354 can be selected by the user to create a quote related to the record 332. The action button 356 can be selected by the user to create a post that is displayed within the social media feed. The action button 358 can be selected by the user to log a call that has been received. The action button 360 can be selected by the user to open a new page that presents other action buttons (not shown in FIG. 3D) that can be selected by the user to perform additional tasks.

Figure 5A:
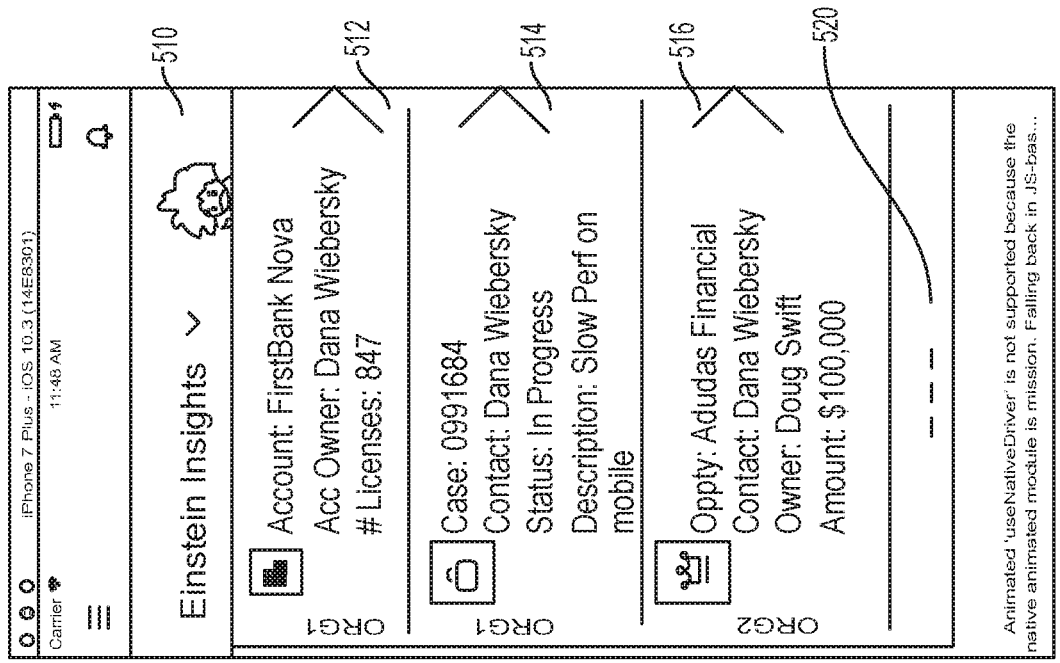
FIG. 5A is an example of another graphical user interface that can be displayed at the mobile communication device during the regular call to display a dynamic insights page in accordance with the disclosed embodiments.
Figure 4:
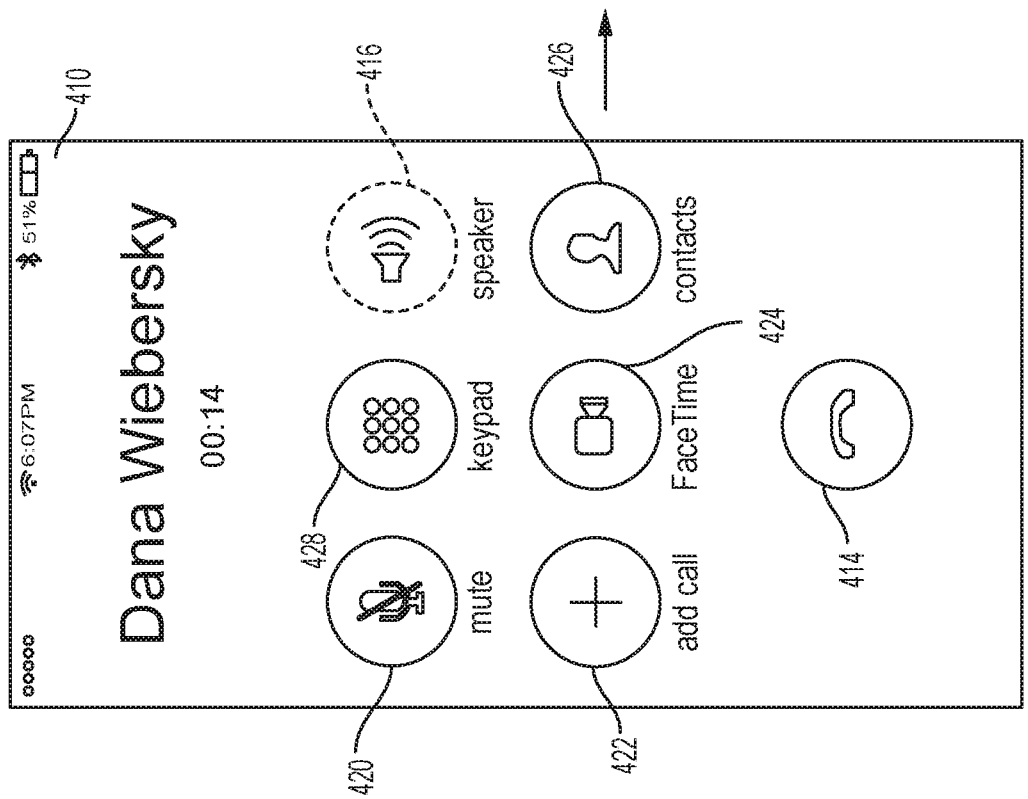
FIG. 4 is an example of a graphical user interface displayed at a mobile communication device when the user receives a regular call in accordance with the disclosed embodiments.
Figure 5B:
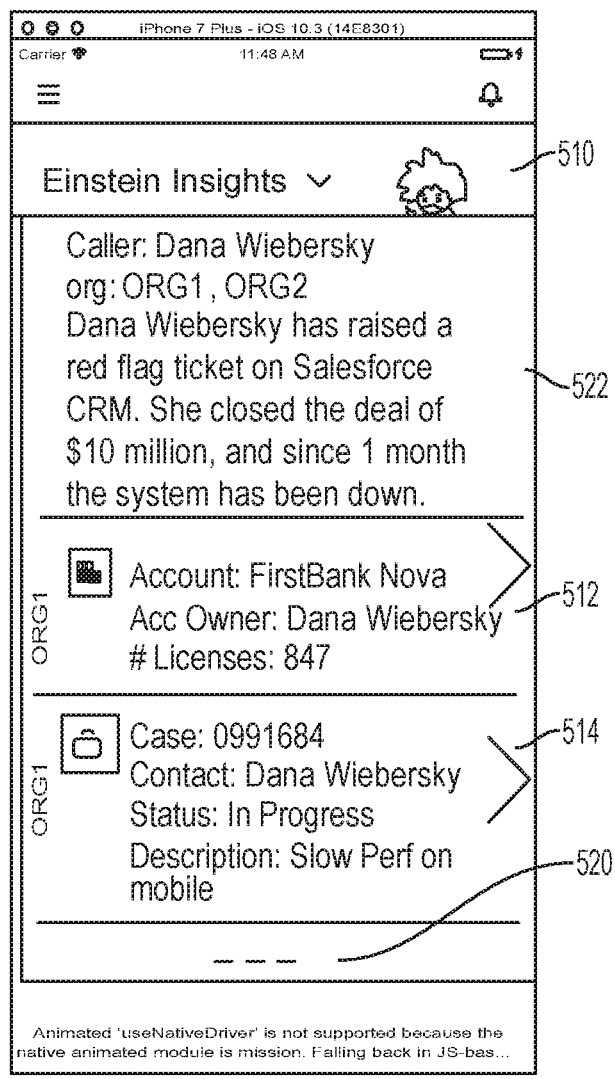
FIG. 5B is an example of another graphical user interface that can be displayed at the mobile communication device during the regular call to display a dynamic insights page having an intelligence summary report in accordance with the disclosed embodiments.

FIGS. 4, 5A and 5B show graphical user interfaces that can be displayed at a mobile communication device when a user receives a regular call (e.g., voice or video call over a cellular network) in accordance with the disclosed embodiments. As will be described in greater detail below, when the user receives a regular call at their mobile communication device 140, a dynamic insights page 510 can be displayed via a graphical user interface at the mobile communication device 140. This dynamic insights page 510 can include user interface elements 512, 514, 516 that are each linked to a record. Each of the records can be associated, for example, with the party that is calling the user, but are not limited to being associated with the calling party. For instance, the records can be associated with the party being called, or another entity or person who is not even part of the call. As in the example described with reference to FIG. 3A, the records, that are linked to the user interface elements displayed via the dynamic insights page 510, can be determined using artificial intelligence technologies that identify records or other information that are relevant, for example, to a particular caller so that the user has information that can assist the user during his/her conversation with the particular caller.

In particular, FIG. 4 is a graphical user interface displayed at a mobile communication device 140 when the user receives a regular call in accordance with the disclosed embodiments. In this particular example, the graphical user interface is one that is commonly displayed on an iPhone®; however, it should be appreciated that the GUI could be one that is displayed for any type of smartphone. In this example, a user has received a regular call to a calle, in particular, a contact named Dana Wiebersky. The graphical user interface can include various user-interface elements including, but not limited to, an end call button 414 that can be selected to end the call, a speaker button 416 that can be selected to place the call on speaker, a mute button 420 that can be used to mute the call, an add call button 422 that can be used to add another user to the call, a FaceTime button 424 that can be selected to switch the regular call from a voice call to a video call, a contacts button 426 that can be selected to display a contacts page, and a keypad button 428 that can be selected to display a numeric keypad for use by the user.

FIG. 5A shows an example of another graphical user interface that can be displayed at the mobile communication device 140 during a regular call to display a dynamic insights page 510 in accordance with the disclosed embodiments. In this embodiment, when an incoming call notification is received at the mobile communication device 140, the user can launch the Salesforce® mobile CRM application which will display the dynamic insights page 510 via a graphical user interface as shown in FIG. 5A. In this non-limiting example, the dynamic insights page 510 is automatically populated with user interface elements 512, 514, 516 that are linked to records that are determined to be relevant given the particular caller. These records can include records associated with the particular caller, or others.

The user interface elements 512, 514, 516 that are displayed via the graphical user interface can include any of the features as described above with respect to FIG. 3A. In this non-limiting example, the user interface elements 512, 514, 516 are linked to records associated with a particular caller who is calling the user's mobile communication device. In this particular example, the dynamic insights page 510 displays user interface elements 512, 514, 516 that are each linked to a record associated with the caller, Dana Wiebersky, including a UI element 512 to a record for an account type object, a UI element 514 to a record for a case type object, and a UI element 516 to a record for an opportunity type object. In addition, although not shown in FIG. 5A, any number of other user interface elements that are each linked to a record could also be included to other records. The user can scroll through the page to display the additional user interface elements that are each linked to a record. Each record that is linked to one of the user interface elements can be associated with a particular organization. In this example, the user interface elements 512, 514 are each linked to a record associated with a first organization (ORG1), whereas the user interface element 516 is associated with a second organization (ORG2). The graphical user interface can also include other types of action buttons as described above with respect to FIG. 3A, such as the ellipsis button 520 can be selected to cause a pop-up sub-menu (not shown) appear that allows a user to take certain predefined actions with respect to a particular record that is selected such as: mark for later, book mark, edit the record, create a new record, etc.

FIG. 5B is an example of another graphical user interface that can be displayed at the mobile communication device during the regular call to display a dynamic insights page 510 having an intelligence summary report 522 in accordance with the disclosed embodiments. FIG. 5B is similar to FIG. 5A except that it includes an intelligence summary report 522. The intelligence summary report 522 shown in FIG. 5B provides the contact name for the caller, the organizations that are associated with that caller, and a summary of key details about the caller, but the intelligence summary report 522 shown in FIG. 5B is one non-limiting example of information that can be included in an intelligence summary report and could include any other information as described above with respect to FIG. 3B. In addition, it should be noted that graphical user interface 330 of FIG. 3D could also be displayed at the mobile communication device after a regular call. The only difference being that for a regular call, the GUI 330 (that displays another page having a record transcription panel) is displayed after the call in response to the user initiating display of the GUI 330.

Figure 6A:
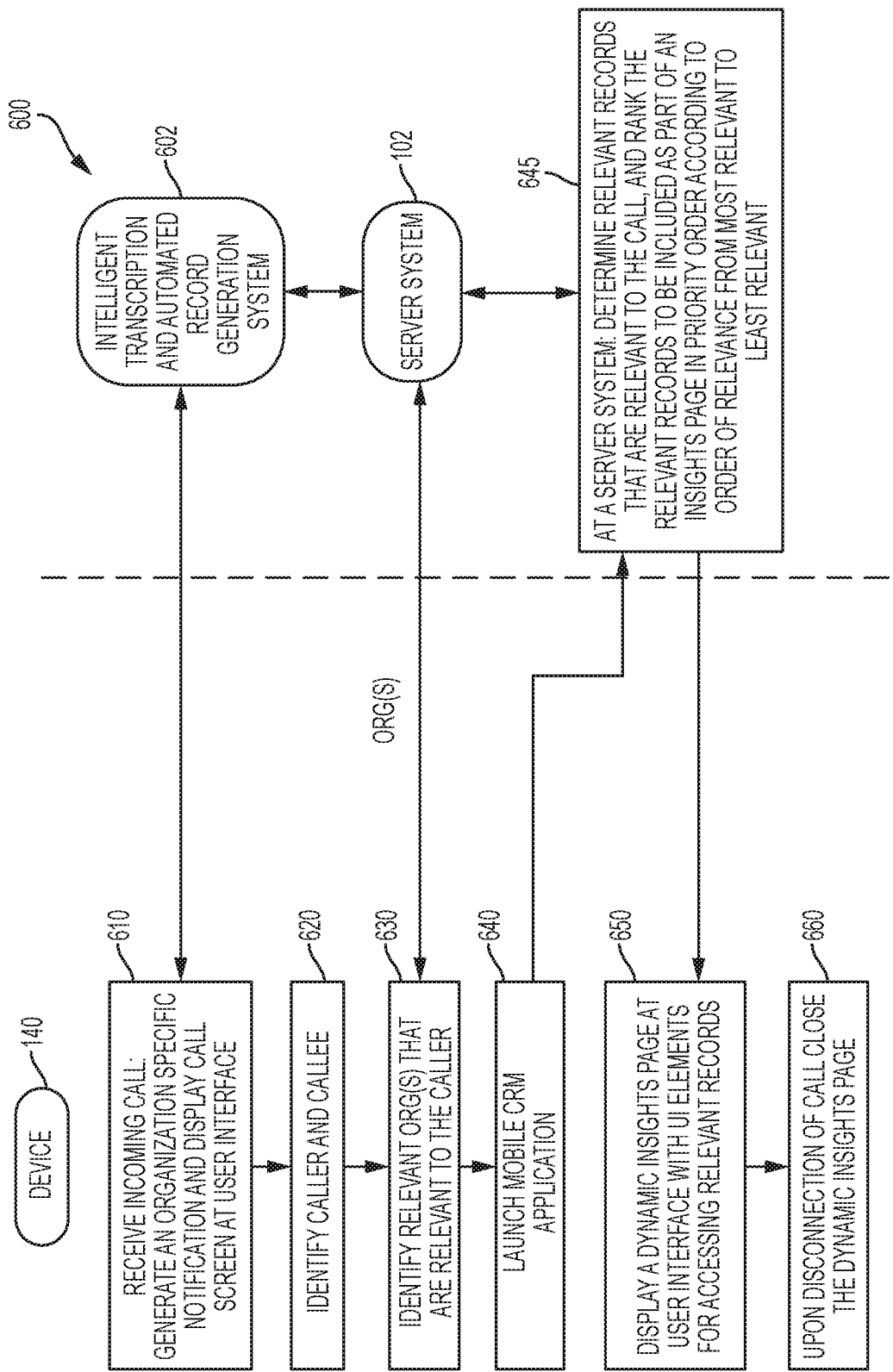
FIG. 6A is a flow chart that illustrates a method in accordance with the disclosed embodiments.
Figure 6B:
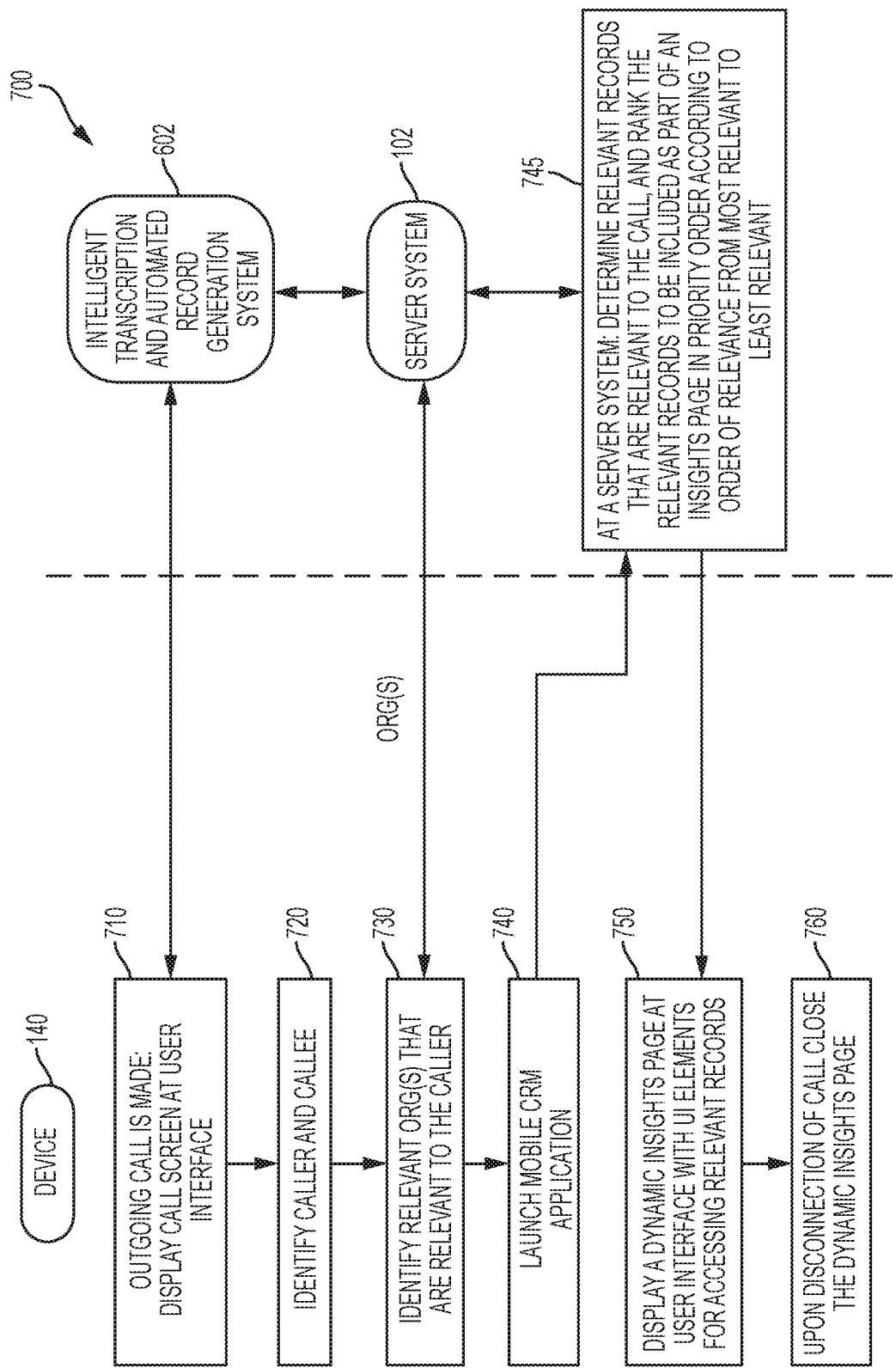
FIG. 6B is a flow chart that illustrates another method in accordance with the disclosed embodiments.
Figure 7A:
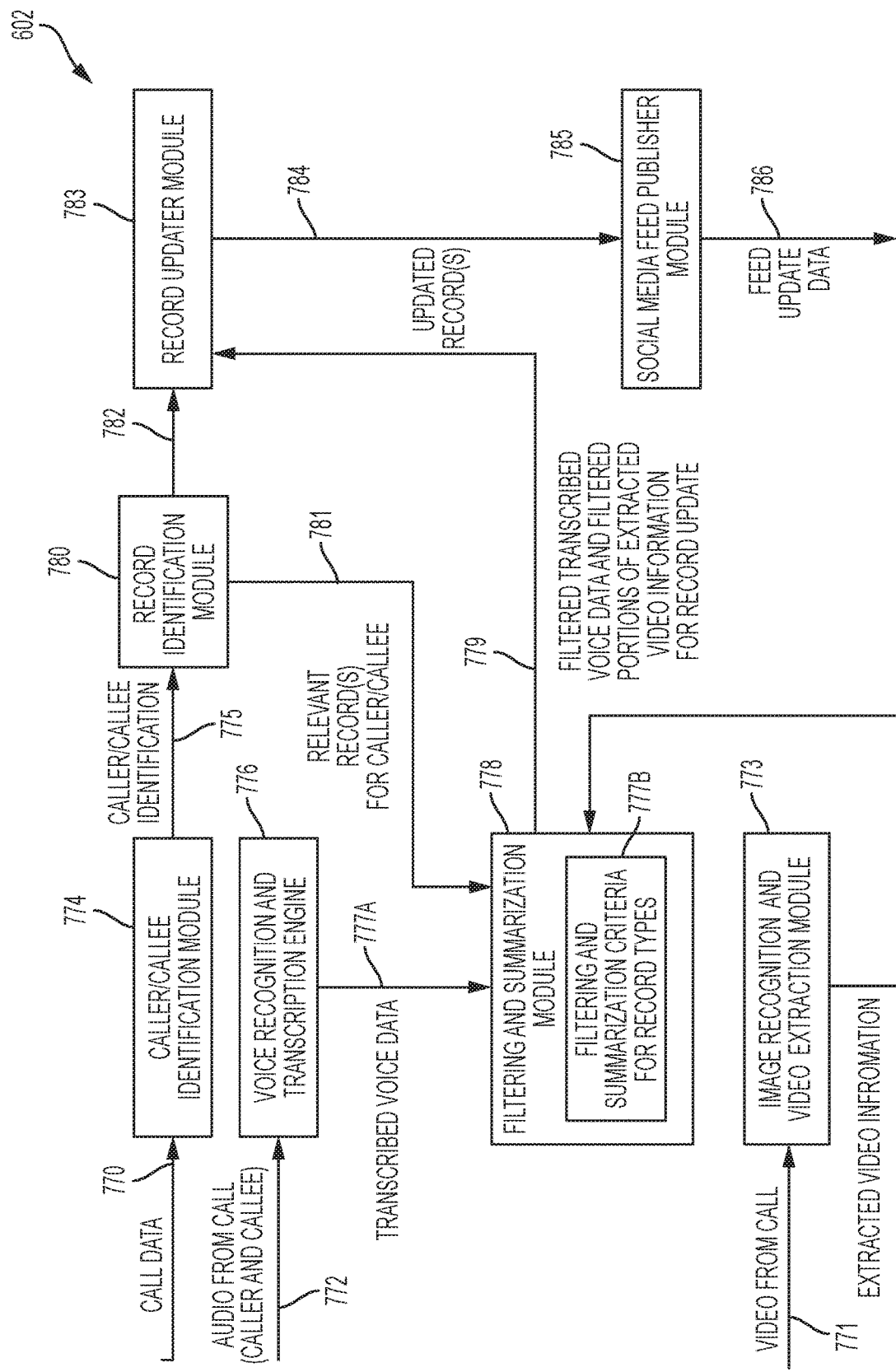
FIG. 7A is a block diagram that illustrates an intelligent transcription and automated record generation system in accordance with the disclosed embodiments.
Figure 7B:
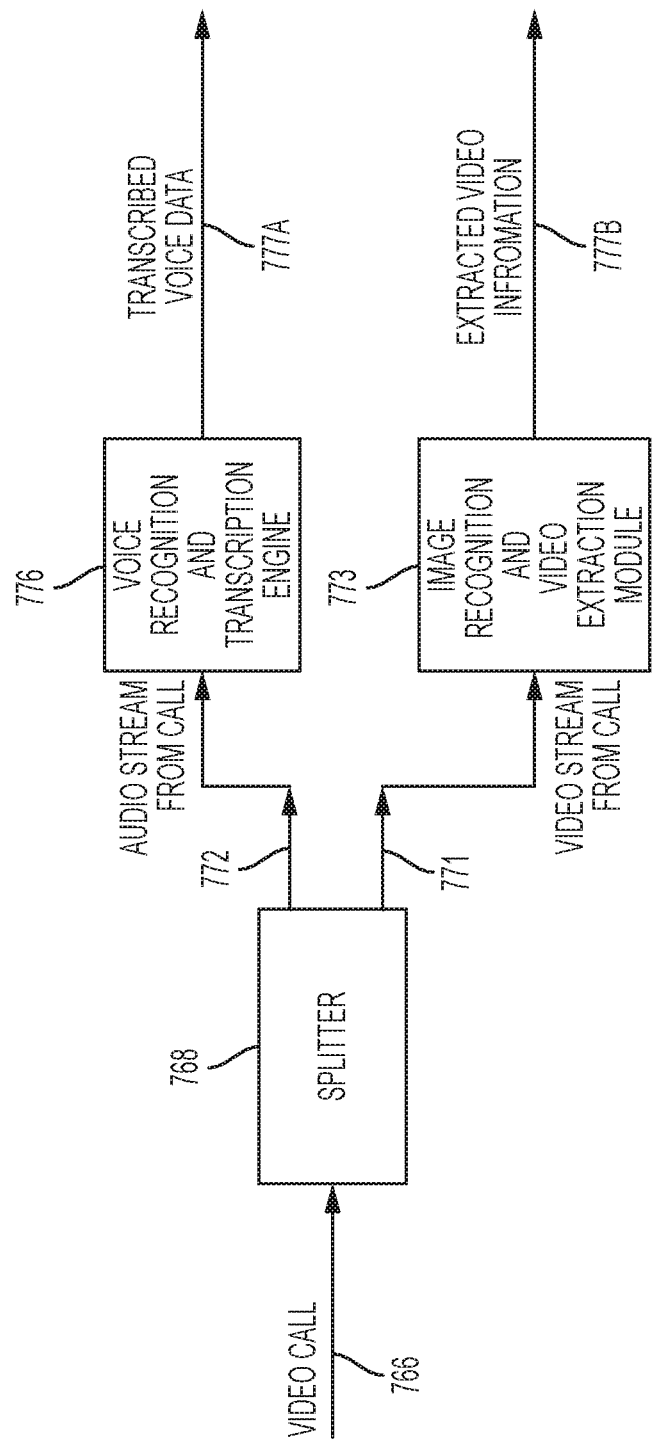
FIG. 7B is a block diagram that illustrates additional processing performed by the intelligent transcription and automated record generation system 602 when the call is a video call in accordance with the disclosed embodiments.
Figure 7C:
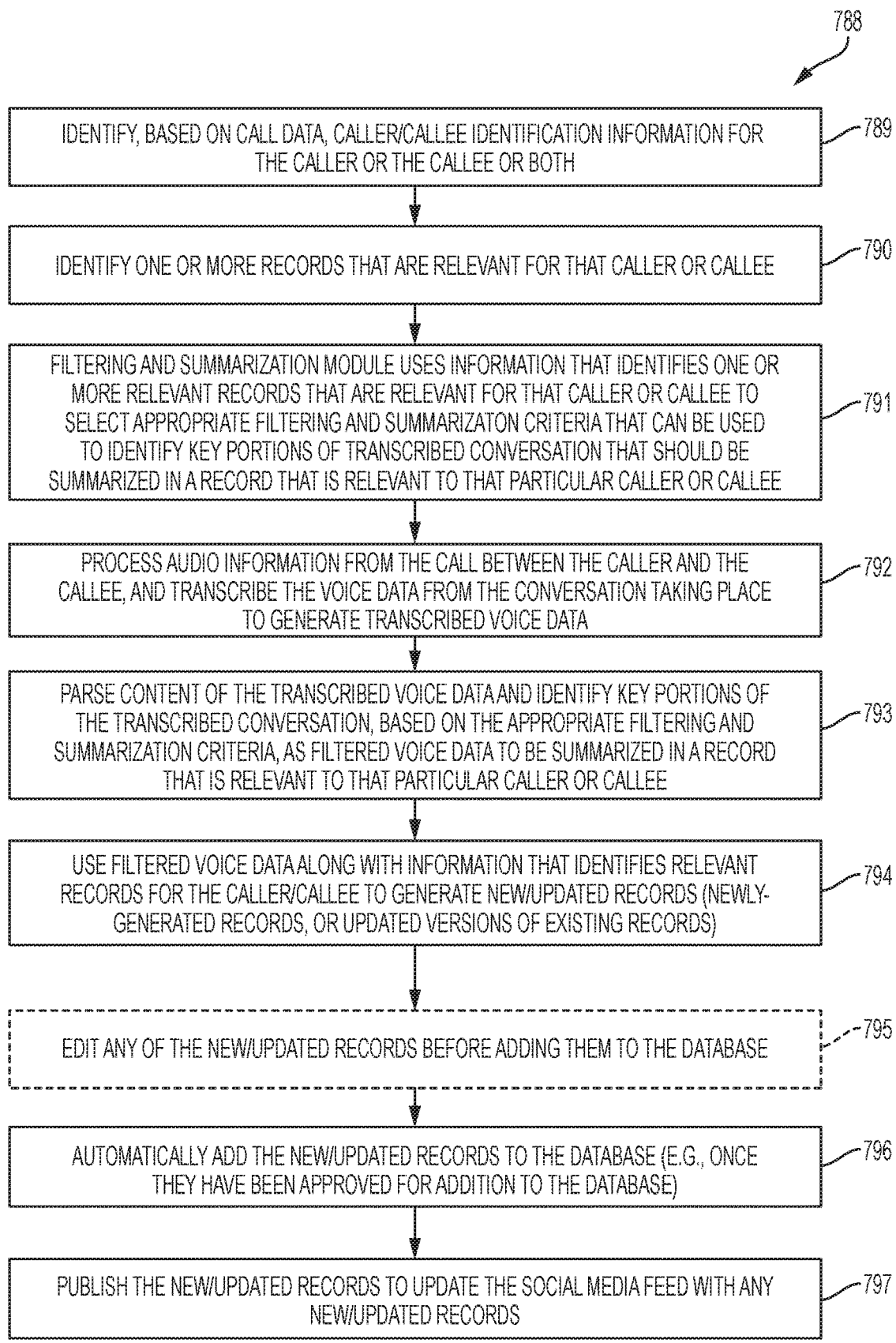
FIG. 7C illustrates a method for automatically transcribing voice data from a call and creating/updating CRM records to include key portions of the transcribed voice data in accordance with the disclosed embodiments.

FIGS. 6A, 6B and 7C are flowcharts that illustrate methods performed in accordance with the disclosed embodiments. FIGS. 6A, 6B and 7C will be described with continued reference to FIGS. 1-5B. With respect to FIGS. 6A 6B and 7C, the steps of each method shown are not necessarily limiting. Steps can be added, omitted, and/or performed simultaneously without departing from the scope of the appended claims. Each method may include any number of additional or alternative tasks, and the tasks shown need not be performed in the illustrated order. Each method may be incorporated into a more comprehensive procedure or process having additional functionality not described in detail herein. Moreover, one or more of the tasks shown could potentially be omitted from an embodiment of each method as long as the intended overall functionality remains intact. Further, each method is computer-implemented in that various tasks or steps that are performed in connection with each method may be performed by software, hardware, firmware, or any combination thereof. For illustrative purposes, the following description of each method may refer to elements mentioned above in connection with FIGS. 1-5B. In certain embodiments, some or all steps of these methods, and/or substantially equivalent steps, are performed by execution of processor-readable instructions stored or included on a processor-readable medium. For instance, in the description of FIGS. 6A, 6B and 7C that follows, the mobile communication device 140 and server system 102 can be described as performing various acts, tasks or steps, but it should be appreciated that this refers to processing system(s) of these entities executing instructions to perform those various acts, tasks or steps. Depending on the implementation, some of the processing system(s) can be centrally located, or distributed among a number of server systems that work together.

FIG. 6A is a flow chart that illustrates a method 600 in accordance with the disclosed embodiments. The method 600 begins at 610, where, in response to receiving an incoming call, the mobile communication device 140 generates an organization specific notification and displays a call screen via a GUI of the mobile communication device 140. In various embodiments, the incoming call can be a regular cellular (e.g., voice or video) call, a WiFi call, or a voice-over-IP call.

Receipt of the incoming call (at 610) triggers activation of an intelligent transcription and automated record generation system 602 that will be described in greater detail below with reference to FIGS. 7A and 7C. When the call is a regular voice call (e.g., a call communicated over a cellular service provider or landline), the intelligent transcription and automated record generation system 602 is implemented at the mobile communication device 140 (or other user system). In this embodiment, the mobile communication device 140 retrieves relevant records from a server system (e.g., a database system of a cloud-based application platform), and the intelligent transcription and automated record generation system 602 is implemented at the mobile communication device 140. By contrast, when the call is a voice-over-IP call or a video call, the intelligent transcription and automated record generation system 602 can be implemented at either (1) exclusively at the mobile communication device 140 (or other user system as described above with reference to the regular voice call), (2) exclusively at a server system (e.g., a database system of a cloud-based application platform), or (3) at partially at (1) and partially at (2).

At 620, an insights application identifies the caller who is making the call and the callee/user of the mobile communication device 140 that is receiving the call. Depending on the implementation, the insights application can be implemented at the mobile communication device 140 and/or the server system 102. The identification can be performed, for example, by determining identifying information associated with each party (e.g., by a contact name, phone number or contact identifier associated with the caller and callee that can be used to identify the caller and callee). For example, a phone number, a contact name or other contact information associated with the caller (i.e., the party a call is being received from) can be used to identify the caller, and this information can then be used to determine a contact identifier for the caller that is specific to the platform, and/or an organization identifier for the caller that is specific to the platform. Likewise, a phone number, a contact name or other contact information associated with the callee (i.e., the party being called) can be used to identify the callee, and this information can then be used to determine a contact identifier for the callee that is specific to the platform, and/or an organization identifier for the callee that is specific to the platform.

In one non-limiting embodiment, at 630, the insights application (e.g., at the server system 102 or at the mobile communication device 140 that communicates with the server system 102) can identify one or more relevant organizations (e.g., any organization including those associated with and relevant to the caller and/or the callee).

At 640, the mobile CRM application can be launched at the mobile communication device 140, and relevant records to be included as part of the dynamic insights page are determined at the server system 102. How the application is launched varies depending on the implementation. For example, in one embodiment, the mobile CRM application automatically launches after identifying the caller and/or callee. In another embodiment, the application can be launched by the user by selecting an action button, icon or other user interface element that causes the mobile CRM application to be launched. At 645, the server system can determine relevant records that are relevant to the call, and rank the relevant records that are to be included as part of an insights page in priority order according to order of relevance from most relevant to least relevant. This information can then be used to order user interface elements that will be part of the insights page, and/or to determine and generate information that will be included as part of an intelligence summary report. In one embodiment, an intelligent ranking module (e.g., at the server system or at the computing device) can apply one or more ranking algorithms that can generate a score for each relevant record, and then rank the relevant records, based on the scores for each relevant record, according to an order of priority (or priority order) that indicates relative importance to the user. For example, in one implementation, the ranking module can dynamically rank all of the relevant records according to relative priority and output a matrix that includes the relevant records ordered according to relative priority. This way records that are likely to be most relevant to the user, based on the current profile for that user will readily be available to the user.

As noted above, in one embodiment, the algorithm used by the ranking module is configurable based on preferences of the end user. For example, in one implementation, a weighting value can be assigned to each input parameter to indicate a relative importance of each input parameter, and the user can set/adjust weighting values to scale the relative importance of each input parameter. Examples of input parameters having adjustable weighting values can include things such as contact information for a particular caller/ callee (e.g., name, contact's phone number, email, social media handle, etc.), CRM data, CRM related record data, CRM Feeds; feeds in which a particular caller/callee is mentioned or tagged in; object types; organizations, social media sources, etc. This allows the user to tune the ranking algorithm(s) to suit their individual preferences. By default, if the user does not change weighting values, the ranking module will use default weighting values to rank the relevant records At 650, the dynamic insights page is displayed at a user interface of the mobile communication device 140. The dynamic insights page includes user interface elements for accessing records as described above. In one non-limiting embodiment, the records can include, but are not limited to, records that are related or relevant to the caller that was identified at 620 from the organizations that were identified at 630 (e.g., records that are relevant to an organization associated with the caller).

At 660, when the call ends or is disconnected, the dynamic insights page is closed at the mobile communication device 140. The system maintains a history log of records that are included in the dynamic insights page so that if a record is deleted it can be tracked from the history log. The mobile CRM application can also be closed or left open depending on the implementation or user preferences.

The examples above that are described with reference to FIGS. 2-6A, describe scenarios for launching a mobile CRM application and displaying a dynamic insights page of that mobile CRM application in response to incoming calls received from callers. However, it should be appreciated that the analogous concepts can be applied when a user makes an outgoing call using their mobile communication device 140 to launch a mobile CRM application and populate a dynamic insights page with UI elements that can include records or other information related to the party being called, as will now be described with reference to FIG. 6B. In one non-limiting embodiment, the dynamic insights page can include, for example, user interface elements that are each linked to a record associated with the party being called (or "callee").

FIG. 6B is a flow chart that illustrates another method 700 in accordance with the disclosed embodiments. The method 700 begins at 710, when an outgoing call is made from the mobile communication device 140 and a call screen is displayed via a GUI of the mobile communication device 140. The outgoing call can be a regular cellular (e.g., voice or video) call, a WiFi call, or a voice-over-IP call. Making the outgoing call triggers activation of an intelligent transcription and automated record generation system 602 that will be described in greater detail below with reference to FIGS. 7A and 7C. At 720, an application identifies the caller/user who is making the call from the mobile communication device 140 and the callee that is receiving the call. The application can be implemented at the mobile communication device 140 and/or the server system 102. The identification can be performed, for example, as described above with reference to step 620 of FIG. 6A.

At 730, the insights application (e.g., at the server system 102 or at the mobile communication device 140 that communicates with the server system 102) can identify one or more relevant organizations (e.g., any organization including those associated with and relevant to the caller and/or the callee).

At 740, the mobile CRM application can be launched at the mobile communication device 140, as described above with reference to step 640 of FIG. 6A. At 750, a dynamic insights page is displayed at the user interface of the mobile communication device 140. The dynamic insights page includes user interface elements for accessing records, as described above. In one non-limiting embodiment, the records can include, but are not limited to, records that are related or relevant to the callee that was identified at 720 from the organizations that were identified at 730. At 745, the server system can determine relevant records that are relevant to the call, and rank the relevant records that are to be included as part of an insights page in priority order according to order of relevance from most relevant to least relevant. This information can then be used to order user interface elements that will be part of the insights page, and/or to determine and generate information that will be included as part of an intelligence summary report. The ranking can be performed by a ranking module as described above with respect to 645 of FIG. 6A.

When the call ends or is disconnected, at 760, the dynamic insights page is closed at the mobile communication device 140. The server system 102 can also maintains a history log of records that are included in the dynamic insights page so that if a record is deleted it can be tracked from the history log. The mobile CRM application can also be closed or left open depending on the implementation or user preferences.

FIG. 7A is a block diagram that illustrates an intelligent transcription and automated record generation system 602 in accordance with the disclosed embodiments. The intelligent transcription and automated record generation system 602 includes an identification module 774, a voice recognition and transcription engine 776, a filtering and summarization module 778, a record identification module 780, a record updater module 783, and a social media feed publisher module 785. Depending on the implementation, modules of the intelligent transcription and automated record generation system 602 can be implemented solely at the server system (e.g., for a VOIP call), partly at the server system and partly at the user system (e.g., for a VOIP call), or solely at the user system (e.g., for a regular voice call or for a VOIP call). Both the server system and the user system can include one or more hardware processors that are configured by programming instructions encoded on non-transient computer readable media to perform the various functions of the identification module 774, the voice recognition and transcription engine 776, the filtering and summarization module 778, the record identification module 780, the record updater module 783, and the social media feed publisher module 785.

The identification module 774 receives call data 770 and processes the call data 770 to identify a caller or callee. The caller/callee identification module 774 can identify the caller/callee using any of the techniques described above (e.g., described above with respect to 620 of FIG. 6A, 720 of FIG. 7C). After identifying the caller or callee, the identification module 774 provides the identification information 775 to the record identification module 780. The identification information 775 identifies either the caller or the callee.

The record identification module 780 uses the identification information 775 to identify records that are relevant for the caller or callee. Depending on the implementation, the relevant records for the caller or callee can be directly associated with the identification information, and/or can be indirectly associated with the identification information caller/callee identification information 775. The record identification module 780 provides the relevant record(s) 781, 782 for the caller/callee to the filtering and summarization module 778 and the record updater module 783.

The record identification module 780 can determine relevant records that are relevant to the call using the techniques described above to determine relevant records that are to be included as part of an insights page. As such, the record identification module 780 can identify records that reference one or more identifiers in a contact profile associated with the caller as being relevant records, and/or identify records that reference one or more identifiers in a contact profile associated with the callee as being relevant records. As above, the contact profile associated with the caller can include, for example, one or more of a contact identifier for the caller and an organization identifier for the caller, and the contact profile associated with the callee can include, for example, one or more of a contact identifier for the callee and a second organization identifier for the callee. In addition, the record identification module 780 can determine relevant records that are relevant to the call using any of the techniques described herein including, but not limited to, a predictive artificial intelligence module to identify records that indirectly reference and are indirectly associated with one or more identifiers in the contact profiles associated with the caller or callee. Also, as noted above, in one embodiment, each of the relevant records can be stored within a CRM system and can have an object type associated with a particular type of object, and each of the relevant records can be determined by analyzing CRM information maintained at the CRM system. Each of the relevant records can associated with a particular organization.

In addition, when the record identification module 780 determines that there are multiple relevant records to be updated, the record identification module 780 can employ any of the techniques described herein to rank the relevant records in priority order according to order of relevance from most relevant to least relevant, and then present the records in priority order for updating to the record updater module 783.

The voice recognition and transcription engine 776 receives the audio from the call between the caller and the callee (e.g., audio from the conversation between the calling parties). The voice recognition and transcription engine 776 performs voice-recognition based on the audio information 772 from the call, and then transcribes the audio from the conversation between the calling parties to generate the transcribed voice data 777A. In addition, in some embodiments, the voice recognition and transcription engine 776 can processes the audio 772 to identify a caller or callee and provide the identification information (that identifies either the caller or the callee) to the record identification module 780.

The filtering and summarization module 778, which is optional, receives the transcribed voice data 777A from the voice recognition and transcription engine 776 and the relevant record(s) 781 for the caller/callee from the record identification module 780. The filtering and summarization module 778 processes the relevant record(s) 781 for the caller/callee using filtering and summarization criteria for the particular record types indicated in the relevant record(s) 781. Each type of record can have certain criteria associated with it that specifies types of information that are important for updating that type of relevant record. To explain further, because the filtering and summarization criteria can be different for different types of records (or object types), the filtered voice data that gets generated by the filtering and summarization module 778 for each record can be different even though the transcribed voice data input to the filtering and summarization module 778 is the same. As such, the filtering and summarization module 778 can generate different filtered voice data for each record type.

The filtering and summarization module 778 processes the transcribed voice data using the particular filtering and summarization criteria for the relevant record(s) 781 for the caller/callee, and generates filtered voice data 779 for record updates. The filtered voice data 779 represents a summarized version of the transcribed voice data. The filtered voice data 779 includes details for record updates that are to be added to each of the relevant record(s) that were specified in the relevant record(s) 781 for the caller/callee. The filtered voice data 779 is provided to the record updater module 783.

The record updater module 783 can use the filtered voice data 779 to update each of the relevant records that are identified by the record identification module 780 as being the relevant record(s) 782 for the caller/callee. In one embodiment, prior to actually updating a record, the record updater module 783 can present the record to a user along with corresponding filtered voice data for that record to allow the user to view that record, edit the corresponding filtered voice data associated with that record (if desired), and approve whether or not that record will actually be updated. When there are multiple relevant records, the record updater module 783 can present the records to the user in priority order (along with corresponding filtered voice data for each record) thereby allowing the user to view each relevant record, edit the corresponding filtered voice data associated with each relevant record (if desired), and approve which relevant records will be updated.

FIG. 7B is a block diagram that illustrates additional processing performed by the intelligent transcription and automated record generation system 602 when the call is a video call in accordance with the disclosed embodiments. FIG. 7B will be described with continued reference to FIG. 7A. When the call is a video call 766, the intelligent transcription and automated record generation system 602 includes a splitter 768 that splits the video call 766 into a video stream 771 that includes the video information from the call and an audio stream 772 that includes the audio information from the call. The audio information can be transcribed as described above for other types of calls.

In addition, an image recognition and video extraction module 773 receives the video stream 771 from the call between the caller and the callee (e.g., video stream that accompanies the audio from the conversation between the calling parties). The image recognition and video extraction module 773 can process the stream of video information 771 from the call to identify images (or sequences of images) in the stream of video information 771. The image recognition and video extraction module 773 can then filter the identified images to extract and capture selected ones of the images as extracted video information 777B. The extracted video information 777B can include important images, screenshot(s) and/or specific message(s) presented on the GUI of the recipient's user system (e.g., mobile communication device). For instance, the extracted video information 777B can include images or short video clips of presentations given during the video call, images of white boards presented during the video call, images of documents or photographs, or any other images that include information that is relevant to and should be attached as a record or part of a record. The extracted video information 777B can be determined based on inputs by the recipient made during the call (e.g., by marking certain images or taking screen shots), and/or automatically by analyzing the stream of video information 771 to filter out, extract and capture important or relevant portions (e.g., that are potentially important to the record). For instance, the image recognition and video extraction module 773 can process the stream of video information 771 from the call to identify scenes that include non-human images, and then use AI technologies that are trained to identify and extract relevant video information 777B from the stream of video information 771.

In most cases only certain selected images are relevant or important to a particular relevant record 781. In one embodiment, although not shown directly in FIG. 7A, the filtering and summarization module 778 can process the extracted video information 777B along with the relevant record(s) 781 (that were identified by from the record identification module 780) using filtering and summarization criteria for the particular record types indicated in the relevant record(s) 781. Each type of record can have certain criteria associated with it that specifies types of information that are important for updating that type of relevant record. To explain further, because the filtering and summarization criteria can be different for different types of records (or object types), the extracted video information 777B that is used to create/update records can be different for each type of record. The filtering and summarization module 778 can process the extracted video information 777B for each record to extract different portions of the extracted video information 777B for each record type. The filtering and summarization module 778 processes the extracted video information 777B using the particular filtering and summarization criteria for the relevant record(s) 781 and extracts portions of the extracted video information 777B for each record that is being updated or created. The portions of the extracted video information 777B can then be used to create or update each of the relevant record(s) 781. The portions of the extracted video information 777B can be different for each record type as specified by the particular filtering and summarization criteria. At least some of the portions of the extracted video information 777B can then provided to the record updater module 783 so that those portions can then be added to the record, for example, as an attachment or link.

In addition, in some embodiments, the image recognition and video extraction module 773 can perform image-recognition based on the video information 771 to identify a caller or callee and provide the identification information (that identifies either the caller or the callee) to the record identification module 780.

Referring again to FIG. 7A, after updating each of the relevant records, the record updater module 783 generates updated record(s) 784. The updated record(s) 784 can be provided to the social media feed publisher module 785, which can process the updated record(s) 784 to generate data for feed updates also referred to herein as feed update data 786. The feed update data 786 can then be used to update the social media feed.

FIG. 7C illustrates a method 788 for automatically transcribing voice data from a call and creating/updating CRM records to include key portions of the transcribed voice data in accordance with the disclosed embodiments The method 788 begins at 789, where the identification module 774 can identify, based on call data, the caller or the callee or both, and provide this caller/callee identification information 775 to the record identification module 780. At 790, the record identification module 780 can identify one or more records that are relevant for that caller or callee. At 791, the record identification module 780 can provide information that identifies the one or more relevant records that are relevant for that caller or callee to the filtering and summarization module 778. The filtering and summarization module 778 can use this information that identifies the one or more relevant records to select appropriate filtering and summarization criteria that can be used at the filtering and summarization module 778 to identify key portions of the transcribed voice data that should be summarized in a record that is relevant to that particular caller or callee.

At 792, the voice recognition and transcription engine 776 can process audio information from the call between the caller and the callee, and transcribe the voice data from the conversation taking place to generate transcribed voice data 777A. In one embodiment, at 793, the filtering and summarization module 778 can parse the content of the transcribed voice data 777A and identify key portions of the transcribed voice data, based on the appropriate filtering and summarization criteria, that should be summarized in a record that is relevant to that particular caller or callee. As noted above, the appropriate filtering and summarization criteria to apply at the filtering and summarization module 778 are chosen by the filtering and summarization module 778 based on the information (provided from record identification module 780) that identifies the one or more relevant records.

For example, in one embodiment, based on certain filtering and summarization criteria that were selected, the filtering and summarization module 778 can process the transcribed voice data to determine key portions that should be utilized to either generate or update records related to that caller or callee. The filtering and summarization module 778 can then provide the filtered voice data for each record update to the record updater module 783. In other words, the key portions of the transcribed voice data that are identified by the filtering and summarization module 778 can then be provided to the record updater module 783 as filtered voice data 779 that is used by record updater module 783 to generate updated records, which can be newly-generated records, or updated versions of existing records.

At 794, the record updater module 783 can utilize this filtered voice data from the filtering and summarization module 778 along with information 782 that identifies relevant records for the caller/callee to update existing records, and/or to generate/create new records. In addition, in use cases where the call is a video call, the record updater module 783 can also include extracted video information 777B in the updated/new records. As described above, the image recognition and video extraction module 773 can process the stream of video information 771 from the call to extract and capture important portions (i.e., that are potentially important to the record). The extracted video information 777B can include any of the information described above. Any records that are updated or newly created by the record updater module 783 will be referred to below as updated records 784 even though it should be appreciated that these can include existing records that have been updated or newly-generated records.

At 795, which is optional, a user can edit any of the updated records 784 before adding them to the database. At 796, the record updater module 783 can automatically add the newly updated records to the database (e.g., once they have been approved for addition to the database). At 797, the social media feed publisher module 785 can publish the updated records via a social media feed, in accordance with the rules of that social media feed, as feed update data 786. This feed update data 786 can be used to update the social media feed with any updated records 784 that were generated.

The following description is of one example of a system in which the features described above may be implemented. The components of the system described below are merely one example and should not be construed as limiting. The features described above with respect to FIGS. 1-7C may be implemented in any other type of computing environment, such as one with multiple servers, one with a single server, a multi-tenant server environment, a single-tenant server environment, or some combination of the above.

Figure 8:
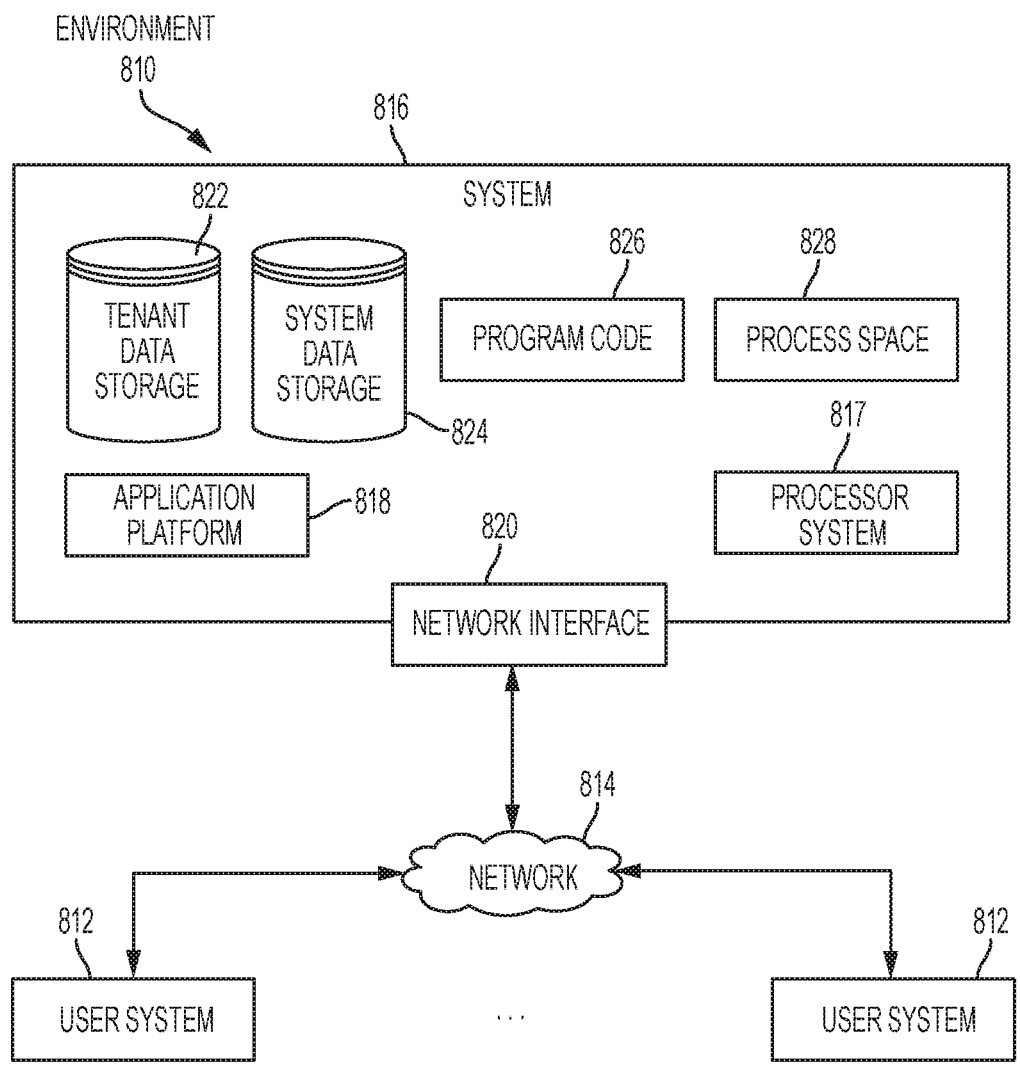
FIG. 8 is a block diagram that illustrates an example of an environment in which an on-demand database service can be used in accordance with some implementations.

FIG. 8 shows a block diagram of an example of an environment 810 in which an on-demand database service can be used in accordance with some implementations. The environment 810 includes user systems 812, a network 814, a database system 816 (also referred to herein as a "cloud-based system"), a processor system 817, an application platform 818, a network interface 820, tenant database 822 for storing tenant data 823, system database 824 for storing system data 825, program code 826 for implementing various functions of the system 816, and process space 828 for executing database system processes and tenant-specific processes, such as running applications as part of an application hosting service. In some other implementations, environment 810 may not have all of these components or systems, or may have other components or systems instead of, or in addition to, those listed above.

In some implementations, the environment 810 is an environment in which an on-demand database service exists. An on-demand database service, such as that which can be implemented using the system 816, is a service that is made available to users outside of the enterprise(s) that own, maintain or provide access to the system 816. As described above, such users generally do not need to be concerned with building or maintaining the system 816. Instead, resources provided by the system 816 may be available for such users' use when the users need services provided by the system 816; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 818 can be a framework that allows the applications of system 816 to execute, such as the hardware or software infrastructure of the system 816. In some implementations, the application platform 818 enables the creation, management and execution of one or more applications developed by the provider of the on-demand database service, users accessing the on-demand database service via user systems 812, or third party application developers accessing the on-demand database service via user systems 812.

In some implementations, the system 816 implements a web-based customer relationship management (CRM) system. For example, in some such implementations, the system 816 includes application servers configured to implement and execute CRM software applications as well as provide related data, code, forms, renderable web pages and documents and other information to and from user systems 812 and to store to, and retrieve from, a database system related data, objects, and Web page content. In some MTS implementations, data for multiple tenants may be stored in the same physical database object in tenant database 822. In some such implementations, tenant data is arranged in the storage medium(s) of tenant database 822 so that data of one tenant is kept logically separate from that of other tenants so that one tenant does not have access to another tenant's data, unless such data is expressly shared. The system 816 also implements applications other than, or in addition to, a CRM application. For example, the system 816 can provide tenant access to multiple hosted (standard and custom) applications, including a CRM application. User (or third party developer) applications, which may or may not include CRM, may be supported by the application platform 818. The application platform 818 manages the creation and storage of the applications into one or more database objects and the execution of the applications in one or more virtual machines in the process space of the system 816.

According to some implementations, each system 816 is configured to provide web pages, forms, applications, data and media content to user (client) systems 812 to support the access by user systems 812 as tenants of system 816. As such, system 816 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 814 can be or include any network or combination of networks of systems or devices that communicate with one another. For example, the network 814 can be or include any one or any combination of a LAN (local area network), WAN (wide area network), telephone network, wireless network, cellular network, point-to-point network, star network, token ring network, hub network, or other appropriate configuration. The network 814 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 812 can communicate with system 816 using TCP/IP and, at a higher network level, other common Internet protocols to communicate, such as HTTP, FTP, AFS, WAP, etc. In an example where HTTP is used, each user system 812 can include an HTTP client commonly referred to as a "web browser" or simply a "browser" for sending and receiving HTTP signals to and from an HTTP server of the system 816. Such an HTTP server can be implemented as the sole network interface 820 between the system 816 and the network 814, but other techniques can be used in addition to or instead of these techniques. In some implementations, the network interface 820 between the system 816 and the network 814 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 812 can be implemented as any computing device(s) or other data processing apparatus or systems usable by users to access the database system 816. For example, any of user systems 812 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 812 typically executes an HTTP client, for example, a web browsing (or simply "browsing") program, such as a web browser based on the WebKit platform, Microsoft's Internet Explorer browser, Netscape's Navigator browser, Opera's browser, Mozilla's Firefox browser, or a WAP-enabled browser in the case of a cellular phone, PDA or other wireless device, or the like, allowing a user (for example, a subscriber of on-demand services provided by the system 816) of the user system 812 to access, process and view information, pages and applications available to it from the system 816 over the network 814.

Each user system 812 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 812 in conjunction with pages, forms, applications and other information provided by the system 816 or other systems or servers. For example, the user interface device can be used to access data and applications hosted by system 816, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 812 may differ in their respective capacities, and the capacity of a particular user system 812 can be entirely determined by permissions (permission levels) for the current user of such user system. For example, where a salesperson is using a particular user system 812 to interact with the system 816, that user system can have the capacities allotted to the salesperson. However, while an administrator is using that user system 812 to interact with the system 816, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 812 and some or all of its components are operator-configurable using applications, such as a browser, including computer code executed using a central processing unit (CPU) such as an Intel Pentium® processor or the like. Similarly, the system 816 (and additional instances of an MTS, where more than one is present) and all of its components can be operator-configurable using application(s) including computer code to run using the processor system 817, which may be implemented to include a CPU, which may include an Intel Pentium® processor or the like, or multiple CPUs.

The system 816 includes tangible computer-readable media having non-transitory instructions stored thereon/in that are executable by or used to program a server or other computing system (or collection of such servers or computing systems) to perform some of the implementation of processes described herein. For example, computer program code 826 can implement instructions for operating and configuring the system 816 to intercommunicate and to process web pages, applications and other data and media content as described herein. In some implementations, the computer code 826 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 9:
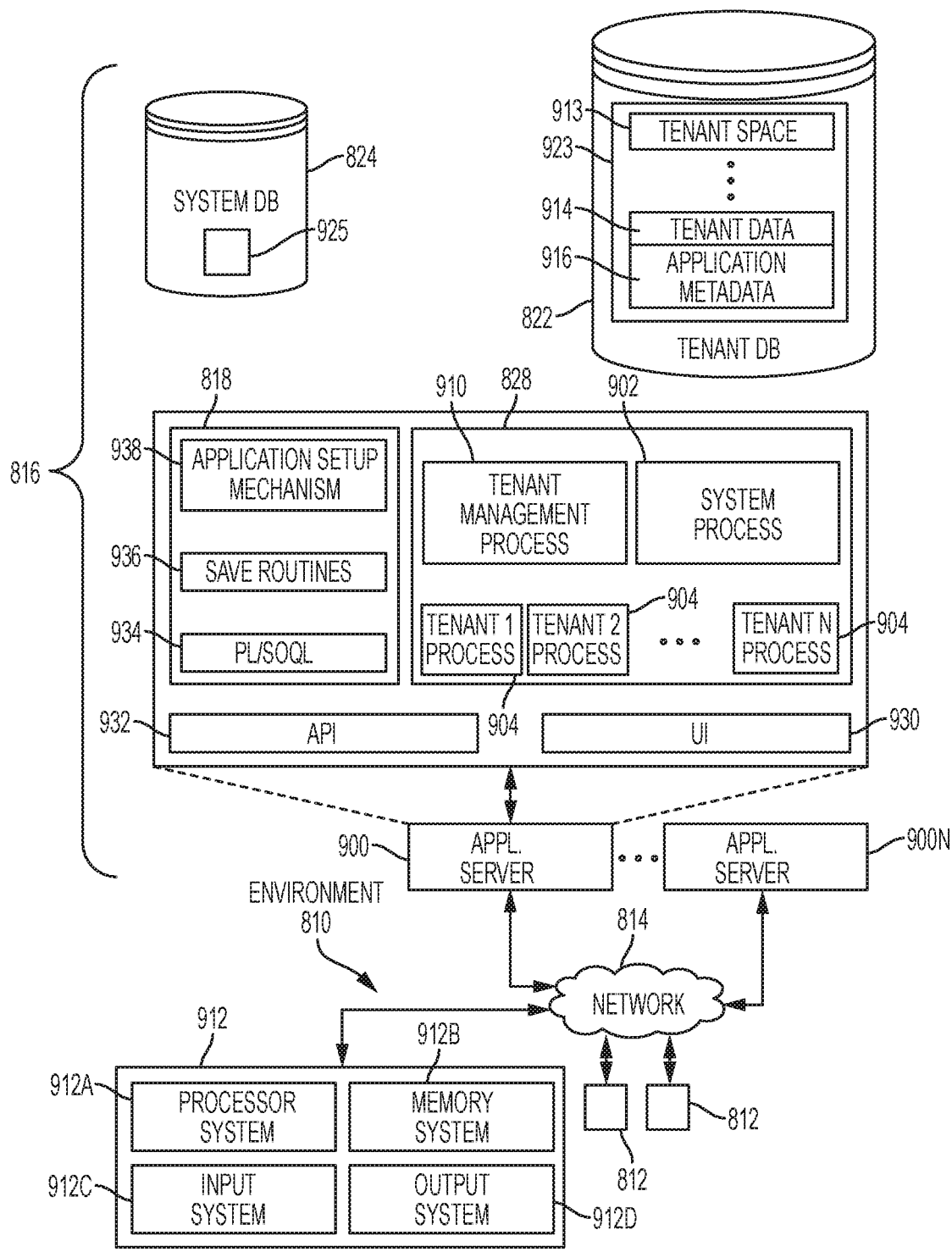
FIG. 9 is a block diagram that illustrates example implementations of elements of FIG. 8 and example interconnections between these elements according to some implementations.

FIG. 9 shows a block diagram of example implementations of elements of FIG. 8 and example interconnections between these elements according to some implementations. That is, FIG. 9 also illustrates environment 810, but FIG. 9, various elements of the system 816 and various interconnections between such elements are shown with more specificity according to some more specific implementations. Elements from FIG. 8 that are also shown in FIG. 9 will use the same reference numbers in FIG. 9 as were used in FIG. 8. Additionally, in FIG. 9, the user system 812 includes a processor system 912A, a memory system 912B, an input system 912C, and an output system 912D. The processor system 912A can include any suitable combination of one or more processors. The memory system 912B can include any suitable combination of one or more memory devices. The input system 912C can include any suitable combination of input devices, such as one or more touchscreen interfaces, keyboards, mice, trackballs, scanners, cameras, or interfaces to networks. The output system 912D can include any suitable combination of output devices, such as one or more display devices, printers, or interfaces to networks.

In FIG. 9, the network interface 820 of FIG. 8 is implemented as a set of HTTP application servers $900_1$-$1400_N$. Each application server 900, also referred to herein as an "app server," is configured to communicate with tenant database 822 and the tenant data 923 therein, as well as system database 824 and the system data 925 therein, to serve requests received from the user systems 912. The tenant data 923 can be divided into individual tenant storage spaces 913, which can be physically or logically arranged or divided. Within each tenant storage space 913, tenant data 914 and application metadata 916 can similarly be allocated for each user. For example, a copy of a user's most recently used (MRU) items can be stored to user storage 914. Similarly, a copy of MRU items for an entire organization that is a tenant can be stored to tenant storage space 913.

The process space 828 includes system process space 902, individual tenant process spaces 904 and a tenant management process space 910. The application platform 818 includes an application setup mechanism 938 that supports application developers' creation and management of applications. Such applications and others can be saved as metadata into tenant database 822 by save routines 936 for execution by subscribers as one or more tenant process spaces 904 managed by tenant management process 910, for example. Invocations to such applications can be coded using PL/SOQL 934, which provides a programming language style interface extension to API 932. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 816 for the subscriber making the invocation and executing the metadata as an application in a virtual machine.

The system 816 of FIG. 9 also includes a user interface (UI) 930 and an application programming interface (API) 932 to system 816 resident processes to users or developers at user systems 912. In some other implementations, the environment 810 may not have the same elements as those listed above or may have other elements instead of, or in addition to, those listed above.

Each application server 900 can be communicably coupled with tenant database 822 and system database 824, for example, having access to tenant data 923 and system data 925, respectively, via a different network connection. For example, one application server $900_1$ can be coupled via the network 814 (for example, the Internet), another application server $900_N$ can be coupled via a direct network link, and another application server (not illustrated) can be coupled by yet a different network connection. Transfer Control Protocol and Internet Protocol (TCP/IP) are examples of typical protocols that can be used for communicating between application servers 900 and the system 816. However, it will be apparent to one skilled in the art that other transport protocols can be used to optimize the system 816 depending on the network interconnections used.

In some implementations, each application server 900 is configured to handle requests for any user associated with any organization that is a tenant of the system 816. Because it can be desirable to be able to add and remove application servers 900 from the server pool at any time and for various reasons, in some implementations there is no server affinity for a user or organization to a specific application server 900. In some such implementations, an interface system implementing a load balancing function (for example, an F5 Big-IP load balancer) is communicably coupled between the application servers 900 and the user systems 912 to distribute requests to the application servers 900. In one implementation, the load balancer uses a least-connections algorithm to route user requests to the application servers 900. Other examples of load balancing algorithms, such as round robin and observed-response-time, also can be used. For example, in some instances, three consecutive requests from the same user could hit three different application servers 900, and three requests from different users could hit the same application server 900. In this manner, by way of example, system 816 can be a multi-tenant system in which system 816 handles storage of, and access to, different objects, data and applications across disparate users and organizations.

In one example storage use case, one tenant can be a company that employs a sales force where each salesperson uses system 816 to manage aspects of their sales. A user can maintain contact data, leads data, customer follow-up data, performance data, goals and progress data, etc., all applicable to that user's personal sales process (for example, in tenant database 822). In an example of a MTS arrangement, because all of the data and the applications to access, view, modify, report, transmit, calculate, etc., can be maintained and accessed by a user system 912 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 816 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 816 also can maintain system level data usable by multiple tenants or other data. Such system level data can include industry reports, news, postings, and the like that are sharable among tenants.

In some implementations, the user systems 912 (which also can be client systems) communicate with the application servers 900 to request and update system-level and tenant-level data from the system 816. Such requests and updates can involve sending one or more queries to tenant database 822 or system database 824. The system 816 (for example, an application server 900 in the system 816) can automatically generate one or more SQL statements (for example, one or more SQL queries) designed to access the desired information. System database 824 can generate query plans to access the requested data from the database.

The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 10A:
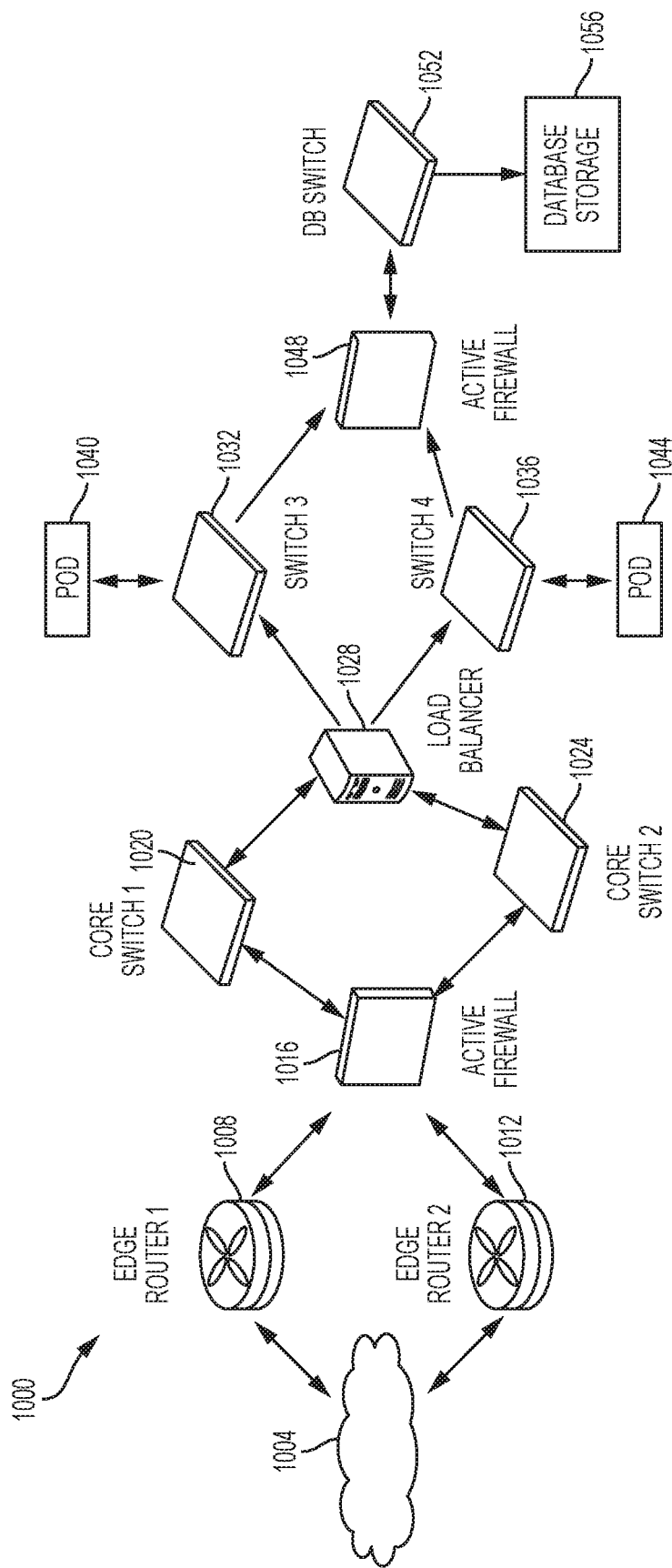
FIG. 10A is a block diagram that illustrates example architectural components of an on-demand database service environment according to some implementations.

FIG. 10A shows a system diagram illustrating example architectural components of an on-demand database service environment 1000 according to some implementations. A client machine communicably connected with the cloud 1004, generally referring to one or more networks in combination, as described herein, can communicate with the on-demand database service environment 1000 via one or more edge routers 1008 and 1012. A client machine can be any of the examples of user systems 12 described above. The edge routers can communicate with one or more core switches 1020 and 1024 through a firewall 1016. The core switches can communicate with a load balancer 1028, which can distribute server load over different pods, such as the pods 1040 and 1044. The pods 1040 and 1044, which can each include one or more servers or other computing resources, can perform data processing and other operations used to provide on-demand services. Communication with the pods can be conducted via pod switches 1032 and 1036. Components of the on-demand database service environment can communicate with database storage 1056 through a database firewall 1048 and a database switch 1052.

Figure 10B:
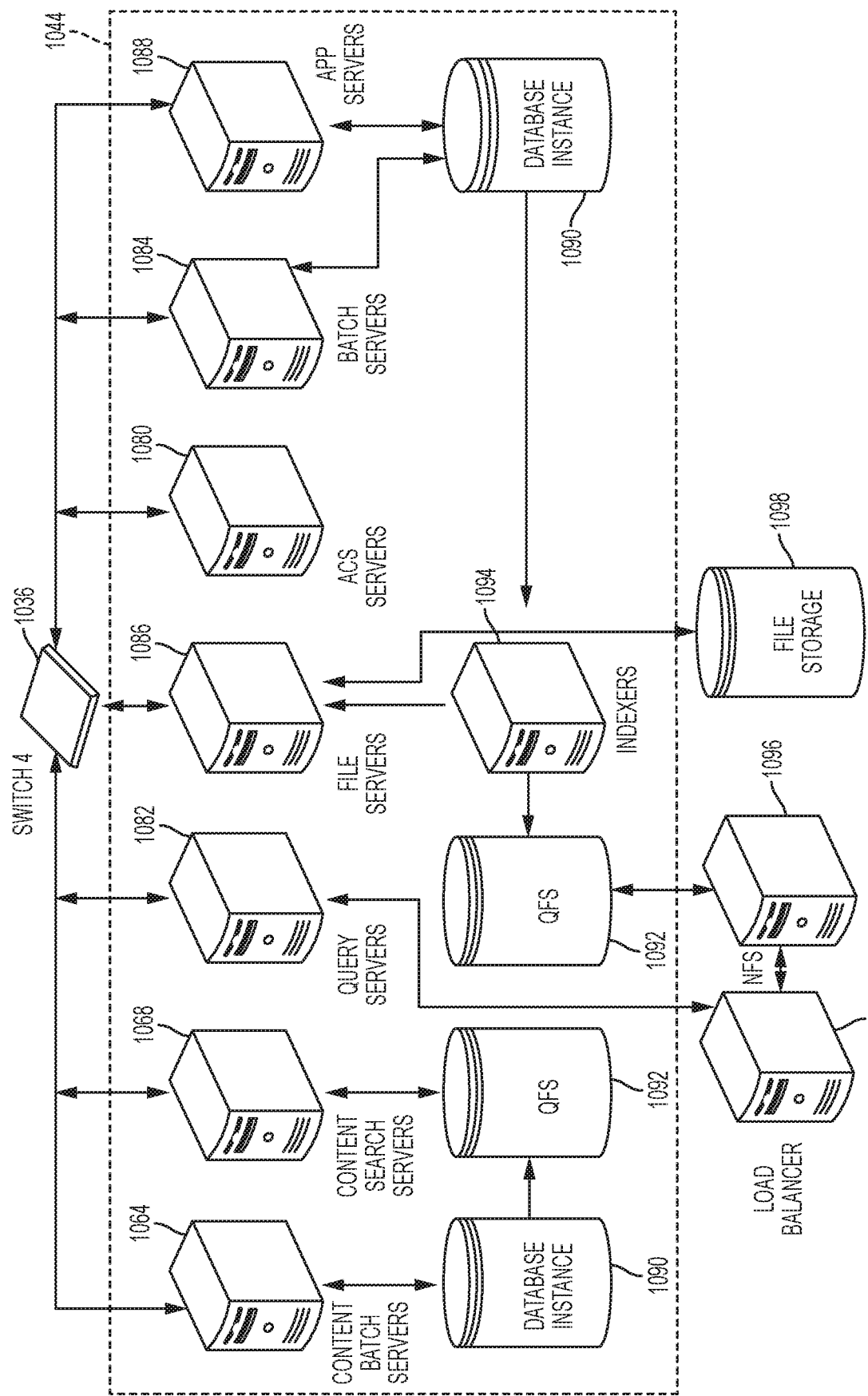
FIG. 10B is a block diagram that further illustrates example architectural components of an on-demand database service environment according to some implementations.

As shown in FIGS. 10A and 10B, accessing an on-demand database service environment can involve communications transmitted among a variety of different hardware or software components. Further, the on-demand database service environment 1000 is a simplified representation of an actual on-demand database service environment. For example, while only one or two devices of each type are shown in FIGS. 10A and 10B, some implementations of an on-demand database service environment can include anywhere from one to several devices of each type. Also, the on-demand database service environment need not include each device shown in FIGS. 10A and 10B, or can include additional devices not shown in FIGS. 10A and 10B.

Additionally, it should be appreciated that one or more of the devices in the on-demand database service environment 1000 can be implemented on the same physical device or on different hardware. Some devices can be implemented using hardware or a combination of hardware and software. Thus, terms such as "data processing apparatus," "machine," "server" and "device" as used herein are not limited to a single hardware device, rather references to these terms can include any suitable combination of hardware and software configured to provide the described functionality.

The cloud 1004 is intended to refer to a data network or multiple data networks, often including the Internet. Client machines communicably connected with the cloud 1004 can communicate with other components of the on-demand database service environment 1000 to access services provided by the on-demand database service environment. For example, client machines can access the on-demand database service environment to retrieve, store, edit, or process information. In some implementations, the edge routers 1008 and 1012 route packets between the cloud 1004 and other components of the on-demand database service environment 1000. For example, the edge routers 1008 and 1012 can employ the Border Gateway Protocol (BGP). The BGP is the core routing protocol of the Internet. The edge routers 1008 and 1012 can maintain a table of IP networks or 'prefixes', which designate network reachability among autonomous systems on the Internet.

In some implementations, the firewall 1016 can protect the inner components of the on-demand database service environment 1000 from Internet traffic. The firewall 1016 can block, permit, or deny access to the inner components of the on-demand database service environment 1000 based upon a set of rules and other criteria. The firewall 1016 can act as one or more of a packet filter, an application gateway, a stateful filter, a proxy server, or any other type of firewall.

In some implementations, the core switches 1020 and 1024 are high-capacity switches that transfer packets within the on-demand database service environment 1000. The core switches 1020 and 1024 can be configured as network bridges that quickly route data between different components within the on-demand database service environment. In some implementations, the use of two or more core switches 1020 and 1024 can provide redundancy or reduced latency.

In some implementations, the pods 1040 and 1044 perform the core data processing and service functions provided by the on-demand database service environment. Each pod can include various types of hardware or software computing resources. An example of the pod architecture is discussed in greater detail with reference to FIG. 10B. In some implementations, communication between the pods 1040 and 1044 is conducted via the pod switches 1032 and 1036. The pod switches 1032 and 1036 can facilitate communication between the pods 1040 and 1044 and client machines communicably connected with the cloud 1004, for example via core switches 1020 and 1024. Also, the pod switches 1032 and 1036 may facilitate communication between the pods 1040 and 1044 and the database storage 1056. In some implementations, the load balancer 1028 can distribute workload between the pods 1040 and 1044. Balancing the on-demand service requests between the pods can assist in improving the use of resources, increasing throughput, reducing response times, or reducing overhead. The load balancer 1028 may include multilayer switches to analyze and forward traffic.

In some implementations, access to the database storage 1056 is guarded by a database firewall 1048. The database firewall 1048 can act as a computer application firewall operating at the database application layer of a protocol stack. The database firewall 1048 can protect the database storage 1056 from application attacks such as structure query language (SQL) injection, database rootkits, and unauthorized information disclosure. In some implementations, the database firewall 1048 includes a host using one or more forms of reverse proxy services to proxy traffic before passing it to a gateway router. The database firewall 1048 can inspect the contents of database traffic and block certain content or database requests. The database firewall 1048 can work on the SQL application level atop the TCP/IP stack, managing applications' connection to the database or SQL management interfaces as well as intercepting and enforcing packets traveling to or from a database network or application interface.

In some implementations, communication with the database storage 1056 is conducted via the database switch 1052. The multi-tenant database storage 1056 can include more than one hardware or software components for handling database queries. Accordingly, the database switch 1052 can direct database queries transmitted by other components of the on-demand database service environment (for example, the pods 1040 and 1044) to the correct components within the database storage 1056. In some implementations, the database storage 1056 is an on-demand database system shared by many different organizations as described above with reference to FIG. 8 and FIG. 9.

FIG. 10B shows a system diagram further illustrating example architectural components of an on-demand database service environment according to some implementations. The pod 1044 can be used to render services to a user of the on-demand database service environment 1000. In some implementations, each pod includes a variety of servers or other systems. The pod 1044 includes one or more content batch servers 1064, content search servers 1068, query servers 1082, file force servers 1086, access control system (ACS) servers 1080, batch servers 1084, and app servers 1088. The pod 1044 also can include database instances 1090, quick file systems (QFS) 1092, and indexers 1094. In some implementations, some or all communication between the servers in the pod 1044 can be transmitted via the switch 1036.

In some implementations, the app servers 1088 include a hardware or software framework dedicated to the execution of procedures (for example, programs, routines, scripts) for supporting the construction of applications provided by the on-demand database service environment 1000 via the pod 1044. In some implementations, the hardware or software framework of an app server 1088 is configured to execute operations of the services described herein, including performance of the blocks of various methods or processes described herein. In some alternative implementations, two or more app servers 1088 can be included and cooperate to perform such methods, or one or more other servers described herein can be configured to perform the disclosed methods.

The content batch servers 1064 can handle requests internal to the pod. Some such requests can be long-running or not tied to a particular customer. For example, the content batch servers 1064 can handle requests related to log mining, cleanup work, and maintenance tasks. The content search servers 1068 can provide query and indexer functions. For example, the functions provided by the content search servers 1068 can allow users to search through content stored in the on-demand database service environment. The file force servers 1086 can manage requests for information stored in the File force storage 1098. The File force storage 1098 can store information such as documents, images, and basic large objects (BLOBs). By managing requests for information using the file force servers 1086, the image footprint on the database can be reduced. The query servers 1082 can be used to retrieve information from one or more file storage systems. For example, the query system 1082 can receive requests for information from the app servers 1088 and transmit information queries to the NFS 1096 located outside the pod.

The pod 1044 can share a database instance 1090 configured as a multi-tenant environment in which different organizations share access to the same database. Additionally, services rendered by the pod 1044 may call upon various hardware or software resources. In some implementations, the ACS servers 1080 control access to data, hardware resources, or software resources. In some implementations, the batch servers 1084 process batch jobs, which are used to run tasks at specified times. For example, the batch servers 1084 can transmit instructions to other servers, such as the app servers 1088, to trigger the batch jobs.

In some implementations, the QFS 1092 is an open source file storage system available from Sun Microsystems® of Santa Clara, Calif. The QFS can serve as a rapid-access file storage system for storing and accessing information available within the pod 1044. The QFS 1092 can support some volume management capabilities, allowing many disks to be grouped together into a file storage system. File storage system metadata can be kept on a separate set of disks, which can be useful for streaming applications where long disk seeks cannot be tolerated. Thus, the QFS system can communicate with one or more content search servers 1068 or indexers 1094 to identify, retrieve, move, or update data stored in the network file storage systems 1096 or other storage systems.

In some implementations, one or more query servers 1082 communicate with the NFS 1096 to retrieve or update information stored outside of the pod 1044. The NFS 1096 can allow servers located in the pod 1044 to access information to access files over a network in a manner similar to how local storage is accessed. In some implementations, queries from the query servers 1082 are transmitted to the NFS 1096 via the load balancer 1028, which can distribute resource requests over various resources available in the on-demand database service environment. The NFS 1096 also can communicate with the QFS 1092 to update the information stored on the NFS 1096 or to provide information to the QFS 1092 for use by servers located within the pod 1044.

In some implementations, the pod includes one or more database instances 1090. The database instance 1090 can transmit information to the QFS 1092. When information is transmitted to the QFS, it can be available for use by servers within the pod 1044 without using an additional database call. In some implementations, database information is transmitted to the indexer 1094. Indexer 1094 can provide an index of information available in the database 1090 or QFS 1092. The index information can be provided to file force servers 1086 or the QFS 1092.

Figure 11:
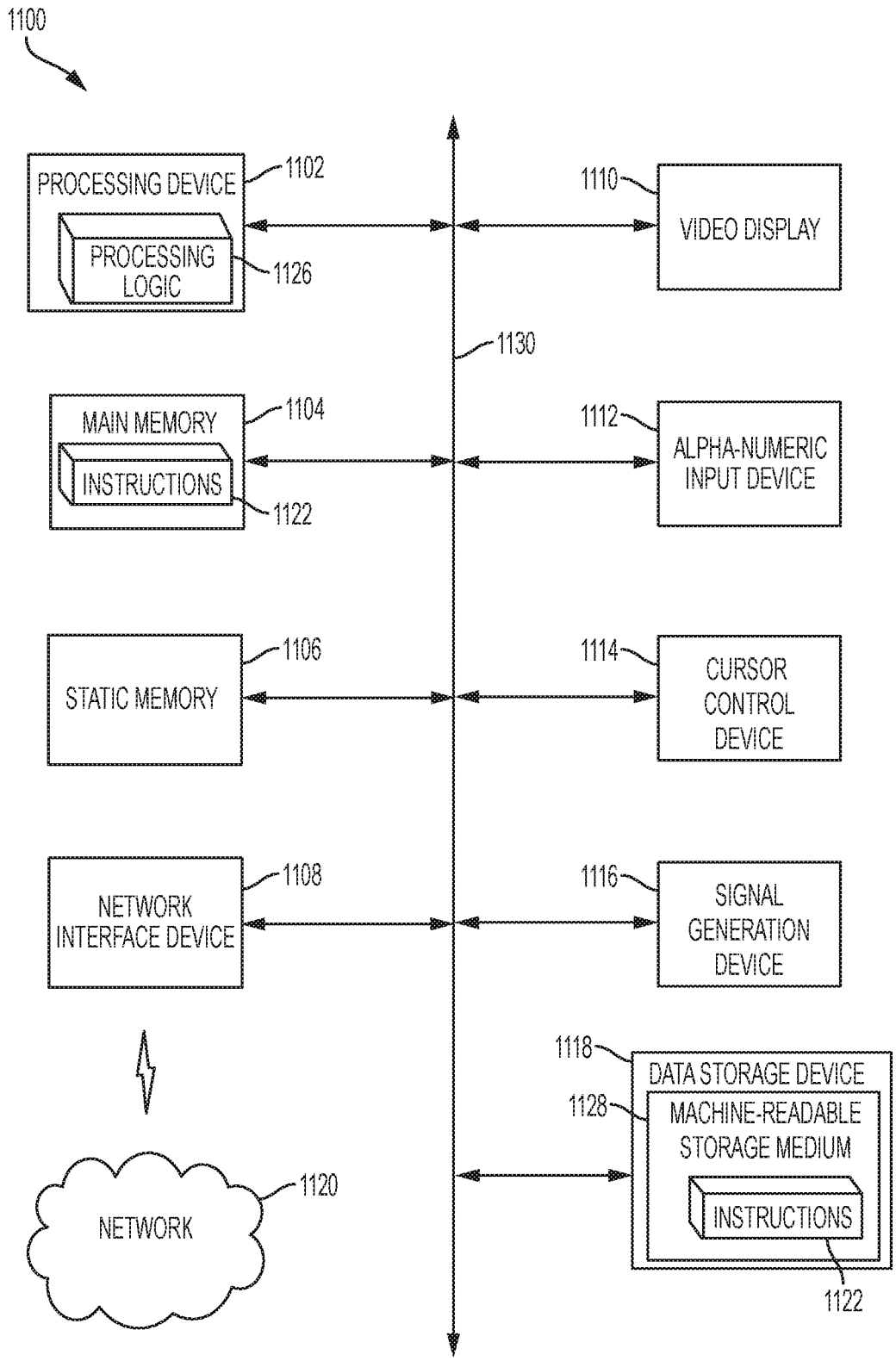
FIG. 11 is a block diagram that illustrates a diagrammatic representation of a machine in the exemplary form of a computer system within which a set of instructions, for causing the machine to perform any one or more of the methodologies discussed herein, may be executed.

FIG. 11 illustrates a diagrammatic representation of a machine in the exemplary form of a computer system 1100 within which a set of instructions, for causing the machine to perform any one or more of the methodologies discussed herein, may be executed. The system 1100 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 1100 may represent a server system 102 as shown in FIG. 1.

The exemplary computer system 1100 includes a processing device (processor) 1102, a main memory 1104 (e.g., read-only memory (ROM), flash memory, dynamic random access memory (DRAM) such as synchronous DRAM (SDRAM)), a static memory 1106 (e.g., flash memory, static random access memory (SRAM)), and a data storage device 1118, which communicate with each other via a bus 1130.

Processing device 1102 represents one or more general-purpose processing devices such as a microprocessor, central processing unit, or the like. More particularly, the processing device 1102 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1102 may also be one or more special-purpose processing devices such as an application specific integrated circuit (ASIC), a field programmable gate array (FPGA), a digital signal processor (DSP), network processor, or the like.

The computer system 1100 may further include a network interface device 1108. The computer system 1100 also may include a video display unit 1110 (e.g., a liquid crystal display (LCD) or a cathode ray tube (CRT)), an alphanumeric input device 1112 (e.g., a keyboard), a cursor control device 1114 (e.g., a mouse), and a signal generation device 1116 (e.g., a speaker).

The data storage device 1118 may include a computer-readable medium 1128 on which is stored one or more sets of instructions 1122 (e.g., instructions of in-memory buffer service 114) embodying any one or more of the methodologies or functions described herein. The instructions 1122 may also reside, completely or at least partially, within the main memory 1104 and/or within processing logic 1126 of the processing device 1102 during execution thereof by the computer system 1100, the main memory 1104 and the processing device 1102 also constituting computer-readable media. The instructions may further be transmitted or received over a network 1120 via the network interface device 1108.

While the computer-readable storage medium 1128 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

Figure 12:
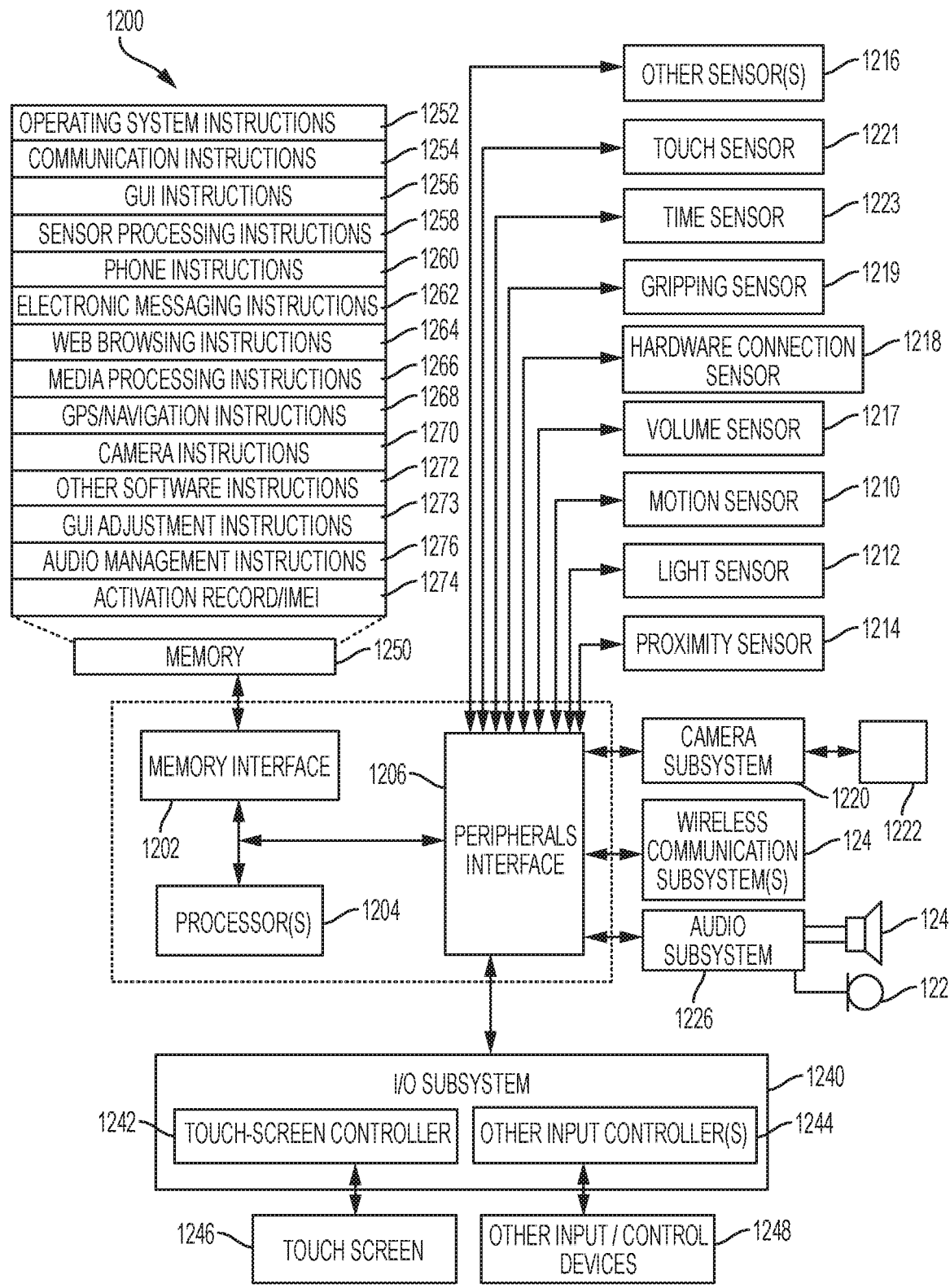
FIG. 12 is a block diagram of an example implementation of a mobile communication device in accordance with the disclosed embodiments.

FIG. 12 is a block diagram of an example implementation 1200 of the mobile communication device 140 of FIG. 1. The mobile communication device 140 can include a memory interface 1202, one or more data processors, image processors and/or central processing units 1204, and a peripherals interface 1206. The memory interface 1202, the one or more processors 1204 and/or the peripherals interface 1206 can be separate components or can be integrated in one or more integrated circuits. The various components in the mobile communication device 140 can be coupled by one or more communication buses or signal lines.

Sensors, devices, and subsystems can be coupled to the peripherals interface 1206 to facilitate multiple functionalities. For example, a motion sensor 1210, a light sensor 1212, and a proximity sensor 1214 can be coupled to the peripherals interface 1206 to facilitate the orientation, lighting, and proximity functions. A hardware connection sensor 1218 can be coupled to the peripherals interface 1206, to facilitate determining a state of connecting the mobile communication device 140 to any hardware, e.g., a docking station, a charger, a personal computer, etc. A gripping sensor 1219 can be coupled to the peripherals interface 1206, to determine if the mobile communication device 140 is being gripped. In various implementation, a gripping sensor can include a temperature sensor, and/or a pressure sensor. Further, a touch sensor 1221 can be coupled to the peripherals interface 1206, to detect if a user is touching user input interface, e.g., a touch screen or a keypad. A time sensor 1223 can also be coupled to the peripherals interface 1206, to detect a duration of a certain state of the mobile communication device 140. Other sensors 1216 can also be connected to the peripherals interface 1206, such as a positioning system (e.g., GPS receiver), a temperature sensor, a biometric sensor, a gyroscope, or other sensing device, to facilitate related functionalities.

A camera subsystem 1220 and an optical sensor 1222, e.g., a charged coupled device CCD) or a complementary metal-oxide semiconductor (CMOS) optical sensor, can be utilized to facilitate camera functions, such as recording photographs and video clips.

Communication functions can be facilitated through one or more wireless communication subsystems 1224, which can include radio frequency receivers and transmitters and/or optical (e.g., infrared) receivers and transmitters. The specific design and implementation of the communication subsystem 1224 can depend on the communication network(s) over which the mobile communication device 140 is intended to operate. In particular, the wireless communication subsystems 1224 may include hosting protocols such that the device 140 may be configured as a base station for other wireless devices.

An audio subsystem 1226 can be coupled to a loudspeaker 124, and microphone 122 to facilitate voice-enabled functions, for example, hands-free functionalities, voice recognition, voice replication, digital recording, and telephony functions.

The I/O subsystem 1240 can include a touch screen controller 1242 and/or other input controller(s) 1244. The touch-screen controller 1242 can be coupled to a touch screen 1246. The touch screen 1246 and touch screen controller 1242 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 1246.

The other input controller(s) 1244 can be coupled to other input; control devices 1248, such as one or more buttons, rocker switches, thumb-wheel, infrared port, USB port; and/or a pointer device such as a stylus. The one or more buttons (not shown) can include an up/down button for volume control of the speaker 126 and loudspeaker 124 and/or the microphone 122.

In some implementations, the mobile communication device 140 can present recorded audio and/or video files, such as MP3, AAC, and MPEG files. In some implementations, the mobile communication device 140 can include the functionality of an MP3 player, such as an iPod™. The mobile communication device 140 may, therefore, include a 126-pin connector that is compatible with the iPod. Other input/output and control devices can also be used.

The memory interface 1202 can be coupled to memory 1250. The memory 1250 can include high-speed random access memory and/or non-volatile memory, such as one or more magnetic disk storage devices, one or more optical storage devices, and/or flash memory (e.g., NAND, NOR). The memory 1250 can store an operating system 1252, such as Darwin, RTXC, LINUX, UNIX, OS X, WINDOWS, or an embedded operating system such as VxWorks. The operating system 1252 may include instructions for handling basic system services and for performing hardware dependent tasks. In some implementations, the operating system 1252 can be a kernel (e.g., UNIX kernel).

The memory 1250 may also store communication instructions 1254 to facilitate communicating with one or more additional devices, one or more computers and/or one or more servers. The memory 1250 may include graphical user interface instructions 1256 to facilitate graphic user interface processing; sensor processing instructions 1258 to facilitate sensor-related processing and functions; phone instructions 1260 to facilitate phone-related processes and functions; electronic messaging instructions 1262 to facilitate electronic-messaging related processes and functions; web browsing instructions 1264 to facilitate web browsing-related processes and functions; media processing instructions 1266 to facilitate media processing-related processes and functions; GPS/navigation instructions 1268 to facilitate GPS and navigation-related processes and instructions; camera instructions 1270 to facilitate camera-related processes and functions; GUI adjustment instructions 1273 to facilitate adjustment of graphical user interfaces and user interface elements in response to sensor data; and/or other software instructions 1272 to facilitate other processes and functions.

In addition, the memory 1250 can store audio management instructions 1276 to facilitate functions managing audio subsystem, including the loudspeaker 124, and the microphone 122. In some implementations, the audio management instructions 1276 are operable to toggle the speakerphone system and adjust speaker volume and/or microphone sensitivity, in response to the sensor processing instructions 1258.

The memory 1250 may also store other software instructions (not shown), such as web video instructions to facilitate web video-related processes and functions; and/or web shopping instructions to facilitate web shopping-related processes and functions. In some implementations, the media processing instructions 1266 are divided into audio processing instructions and video processing instructions to facilitate audio processing-related processes and functions and video processing-related processes and functions, respectively. An activation record and International Mobile Equipment Identity (IMEI) 1274 or similar hardware identifier can also be stored in memory 1250.

Each of the above identified instructions and applications can correspond to a set of instructions for performing one or more functions described above. These instructions need not be implemented as separate software programs, procedures, or modules. The memory 1250 can include additional instructions or fewer instructions. Furthermore, various functions of the mobile communication device 140 may be implemented in hardware and/or in software, including in one or more signal processing and/or application specific integrated circuits.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "identifying", "adding", "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for identifying and modifying a record associated with a customer using voice data from a conversation during a call between the customer and another party, comprising:
    automatically identifying, at a record identification module of a customer relationship management (CRM) system in response to a call from a customer, a record associated with the customer in a customer relationship management (CRM) database that is relevant to a call with the customer by analyzing CRM information maintained at the CRM system, wherein the record is also associated with a particular organization, wherein the record has a particular record type of a plurality of different record types, wherein each record type corresponds to a particular object type in the CRM database;
    processing, at a voice recognition and transcription engine, audio information from the call and transcribing voice data from the call to generate transcribed voice data from the conversation between calling parties;
    at a filtering and summarization module: parsing content of the transcribed voice data; selecting, based on the particular record type of the record and information that identifies the record from the record identification module, appropriate filtering and summarization criteria that are used to identify key portions of the transcribed voice data to be summarized as part of the record having that particular record type, wherein the appropriate filtering and summarization criteria that are selected are for the particular record type associated with the record, wherein filtering and summarization criteria for each record type are different and specify information that is important for updating that particular record type; and identifying the key portions of the transcribed voice data, based on the appropriate filtering and summarization criteria for that particular record type, as filtered voice data, wherein the key portions of the transcribed voice data are portions of the transcribed voice data that are to be summarized in the record for that particular record type; and
    automatically modifying, at the record updater module, the record associated with the customer in the CRM database to include at least part of the filtered voice data in the record.

2. The method according to claim 1, further comprising:
    identifying, via an identification module based on call data, a calling party that is part of a call, wherein the calling party is one or more of a caller who is making a call and a callee that is receiving the call; and
    providing identification information that identifies the calling party to the record identification module.

3. The method according to claim 1, wherein automatically modifying, comprises:
    automatically modifying, at the record updater module, the record to include the filtered voice data.

4. The method according to claim 1, wherein automatically modifying, comprises:
    automatically generating, at the record updater module, a new record that includes at least part of the filtered voice data.

5. The method according to claim 1, wherein automatically modifying, comprises:
    automatically modifying, at the record updater module, an existing record to include at least part of the filtered voice data to generate an updated version of the existing record.

6. The method according to claim 1, further comprising:
    automatically adding, via the record updater module, the modified record to the CRM database.

7. The method according to claim 6, further comprising:
    displaying, at a user interface of a user system, a user interface element that includes the filtered voice data from the call;
    presenting, via the user interface, an option to edit the filtered voice data prior to automatically adding the modified record to the CRM database; and
    wherein automatically adding comprises:
    in response to an input via the user interface approving addition of the modified record to the CRM database, automatically adding the modified record to the CRM database via the record updater module.

8. The method according to claim 6, further comprising:
publishing, via a publisher module, the modified record in a social media feed to update the social media feed with the modified record.

9. An intelligent transcription and automated record generation system, comprising:
one or more hardware processors;
memory comprising processor-executable instructions encoded on a non-transient processor-readable media, wherein the one or more hardware processors are configurable to execute the processor-executable instructions to:
automatically identify a record associated with the customer, in a customer relationship management (CRM) database of a customer relationship management (CRM) system in response to a call from a customer, that is relevant to a call with the customer by analyzing CRM information maintained at the CRM system, wherein the record is also associated with a particular organization, wherein the record has a particular record type of a plurality of different record types, wherein each record type corresponds to a particular object type in the CRM database;
process audio information from the call and transcribe voice data from the call to generate transcribed voice data;
parse content of the transcribed voice data;
select, based on the particular record type of the record and information that identifies the record from the record identification module, appropriate filtering and summarization criteria that are used to identify key portions of the transcribed voice data to be summarized as part of the record having that particular record type, wherein the appropriate filtering and summarization criteria that are selected are for the particular record type associated with the record, wherein filtering and summarization criteria for each record type are different and specify information that is important for updating that particular record type;
identify the key portions of the transcribed voice data, based on the appropriate filtering and summarization criteria for that particular record type, as filtered voice data, wherein the key portions of the transcribed voice data are portions of the transcribed voice data that are to be summarized in the record for that particular record type;
provide the filtered voice data to the record updater module; and
automatically modify the record associated with the customer in the CRM database to include at least part of the filtered voice data.

10. The intelligent transcription and automated record generation system according to claim 9, wherein the one or more hardware processors are further configurable to execute the processor-executable instructions to:
identify, based on call data, a calling party that is part of a call, and to provide identification information that identifies the calling party to the record identification module, wherein the calling party is one or more of a caller who is making a call and a callee that is receiving the call.

11. The intelligent transcription and automated record generation system according to claim 9, wherein the one or more hardware processors are further configurable to execute the processor-executable instructions to automatically modify the record to include the filtered voice data.

12. The intelligent transcription and automated record generation system according to claim 9, wherein the one or more hardware processors are further configurable to execute the processor-executable instructions to automatically generate a new record that includes at least part of the filtered voice data.

13. The intelligent transcription and automated record generation system according to claim 9, wherein the one or more hardware processors are further configurable to execute the processor-executable instructions to automatically modify an existing record to include at least part of the filtered voice data to generate an updated version of the existing record.

14. The intelligent transcription and automated record generation system according to claim 9, wherein the one or more hardware processors are further configurable to execute the processor-executable instructions to automatically add the modified record to the CRM database.

15. The intelligent transcription and automated record generation system according to claim 14, wherein the one or more hardware processors are further configurable to execute the processor-executable instructions to:
display a user interface element, via a graphical user interface, that includes the filtered voice data from the call and to present an option to edit the filtered voice data prior to automatically adding the modified record to the CRM database; and
automatically add the modified record to the CRM database in response to an input via the user interface approving addition of the modified record to the CRM database.

16. The intelligent transcription and automated record generation system according to claim 14, wherein the one or more hardware processors are further configurable to execute the processor-executable instructions to:
publish the modified record in a social media feed to update the social media feed with the modified record.

17. The intelligent transcription and automated record generation system according to claim 9, wherein the intelligent transcription and automated record generation system is implemented at:
a user system that retrieves relevant records from a server system when the call is a regular voice call over a cellular service provider, or
at one or more of a user system and a server system of a cloud-based application platform when the call is a voice-over-IP call, or
at one or more of a user system and a server system when the call is a video call.

18. A computing system, comprising:
a user interface;
one or more hardware processors; and
a memory comprising computer-executable instructions encoded on non-transient processor-readable media that, when executed by the one or more hardware processors, configure the one or more hardware processors to cause the computing system to:
automatically identify a record associated with the customer, in a customer relationship management (CRM) database of a customer relationship management (CRM) system in response to a call from a customer, that is relevant to a call with the customer by analyzing CRM information maintained at the CRM system, wherein the record is also associated with a particular organization, wherein the record has a particular record type of a plurality of different record types, wherein each record type corresponds to a particular object type in the CRM database;

process audio information from the call and transcribe voice data from the call to generate transcribed voice data;

parse content of the transcribed voice data;

select, based on the particular record type of the record and information that identifies the record from the record identification module, appropriate filtering and summarization criteria that are used to identify key portions of the transcribed voice data to be summarized as part of the record having that particular record type, wherein the appropriate filtering and summarization criteria that are selected are for the particular record type associated with the record, wherein filtering and summarization criteria for each record type are different and specify information that is important for updating that particular record type;

identify the key portions of the transcribed voice data, based on the appropriate filtering and summarization criteria for that particular record type, as filtered voice data, wherein the key portions of the transcribed voice data are portions of the transcribed voice data that are to be summarized in the record for that particular record type;

provide the filtered voice data to the record updater module;

display a user interface element via the user interface that includes the filtered voice data;

present an option to edit the filtered voice data via the user interface prior to automatically modifying the record to include at least part of the filtered voice data and automatically adding a modified record that is relevant to the call to the CRM database; and in response to an input via the user interface approving addition of the modified record to the CRM database: automatically modify the record associated with the customer in the CRM database to include at least part of the filtered voice data and automatically add the modified record to the CRM database.

* * * * *